US012401469B2

(12) United States Patent
Noh et al.

(10) Patent No.: US 12,401,469 B2
(45) Date of Patent: Aug. 26, 2025

(54) LOW LATENCY IN WIRELESS COMMUNICATION SYSTEM

(71) Applicant: Senscomm Semiconductor Co., Ltd., Suzhou (CN)

(72) Inventors: Yujin Noh, Laguna Hills, CA (US); Sung Jin Park, Seoul (KR); Seung Ho Choo, Suzhou (CN); Daehong Kim, Laguna Hills, CA (US)

(73) Assignee: Senscomm Semiconductor Co., Ltd., Suzhou (CN)

( * ) Notice: Subject to any disclaimer, the term of this patent is extended or adjusted under 35 U.S.C. 154(b) by 328 days.

(21) Appl. No.: 18/331,103

(22) Filed: Jun. 7, 2023

(65) Prior Publication Data

US 2023/0403112 A1 Dec. 14, 2023

Related U.S. Application Data

(60) Provisional application No. 63/498,220, filed on Apr. 25, 2023, provisional application No. 63/366,088, filed on Jun. 9, 2022.

(30) Foreign Application Priority Data

Jun. 1, 2023 (CN) .................. 202310644232.X

(51) Int. Cl.
*H04L 5/00* (2006.01)
(52) U.S. Cl.
CPC .......... *H04L 5/0044* (2013.01); *H04L 5/0053* (2013.01)

(58) Field of Classification Search
None
See application file for complete search history.

(56) References Cited

U.S. PATENT DOCUMENTS

| | | | | |
|---|---|---|---|---|
| 2021/0385688 A1* | 12/2021 | Liu | .................. | H04L 5/0048 |
| 2021/0392644 A1* | 12/2021 | Liu | .................. | H04L 5/0053 |
| 2022/0116921 A1* | 4/2022 | Lim | .................. | H04W 72/044 |
| 2022/0150015 A1* | 5/2022 | Liu | .................. | H04L 5/0055 |
| 2022/0263636 A1* | 8/2022 | Hu | .................. | H04L 5/0094 |
| 2024/0080082 A1* | 3/2024 | Park | .................. | H04W 76/15 |

* cited by examiner

*Primary Examiner* — Anh Vu H Ly
(74) *Attorney, Agent, or Firm* — BROADVIEW IP LAW, PC

(57) ABSTRACT

An electronic device receives a physical layer (PHY) protocol data unit (PPDU) including a PHY preamble including a non-high-throughput (Non-HT) short training field (L-STF), a Non-HT long training field (L-LTF), a Non-HT signal (L-SIG) field, a repeated Non-HT signal (RL-SIG) field, and a universal signal (U-SIG) field. The electronic device checks a control field in the PPDU. The control field indicates whether the PHY preamble in the PPDU carries payload information and the PPDU carries no data field carrying payload information. The electronic device obtains the payload information from the PHY preamble and processes the payload information if the control field indicates that the PHY preamble in the PPDU includes the payload information and the PPDU carries no data field.

20 Claims, 17 Drawing Sheets

EHT MU PPDU format

EHT TB PPDU format

LOW LATENCY IN WIRELESS COMMUNICATION SYSTEM

CROSS REFERENCE TO RELATED APPLICATION

This application claims benefit of U.S. Provisional Application No. 63/366,088 filed on Jun. 9, 2022, and U.S. Provisional Application No. 63/498,220 filed on Apr. 25, 2023, in the United States Patent and Trademark Office, and China Patent Application No. 202310644232X filed on Jun. 1, 2023, in the China National Intellectual Property Administration, the entire contents of which are hereby incorporated by reference.

TECHNICAL FIELD

The disclosure relates to wireless communication systems, and more particularly to, for example, but not limited to, wireless communication devices for low latency.

BACKGROUND

The wireless local area network (WLAN) continues its growth and has become essential technology for providing wireless data services in different environments. In addition to the increased throughput and overall efficiency requirements as emerging and huge potential use cases, high reliability and low latency are being considered. The example of these use cases are Virtual Reality (VR) and Augmented Reality (AR), immersive gaming, remote office, and cloud-computing. Those cases require more challenging time-sensitive technologies.

The description set forth in the background section should not be assumed to be prior art merely because it is set forth in the background section. The background section may describe aspects or embodiments of the present disclosure.

SUMMARY

Embodiments allow the electronic devices to facilitate wireless communication. More particularly, embodiments allow the WLAN and wireless devices to increase throughput and reduce latency.

One aspect of the present disclosure may provide an electronic device for facilitating wireless communication, comprising processing circuitry configured to cause: receiving a physical layer (PHY) protocol data unit (PPDU) including a PHY preamble including a first short training field (STF) corresponding to a non-high-throughput (Non-HT) short training field (L-STF), a first long training field (LTF) corresponding to a Non-HT long training field (L-LTF), a first signal field corresponding to a Non-HT signal (L-SIG) field, a second signal field corresponding to a repeated Non-HT signal (RL-SIG) field, and a third signal field corresponding to a universal signal (U-SIG) field; checking a control field in the PPDU, the control field indicating whether the PHY preamble in the PPDU carries payload information and the PPDU includes no data field carrying payload information; obtaining the payload information from the PHY preamble if the control field indicates that the PHY preamble in the PPDU includes the payload information and the PPDU carries no data field; and processing the payload information.

Processing the payload information may comprise obtaining a PPDU type field from the PHY preamble, the PPDU type field indicating which payload information is included in the PHY preamble of the PPDU; and processing the payload information based on the PPDU type field.

The payload information may be processed as an ACK frame if the PPDU type field indicates that the PHY preamble of the PPDU includes payload information for the ACK frame.

The payload information may include a receiver address field and a transmitter address field.

The payload information may be processed as a block ACK frame if the PPDU type field indicates that the PHY preamble of the PPDU includes payload information for the block ACK frame.

The payload information may include a starting sequence control field containing a sequence number of the first MSDU or A-MSDU, and a block ack bitmap field indicating a received status of a plurality of MSDUs or A-MSDUs.

The payload information may be processed as a PS-Poll frame if the PPDU type field indicates that the PHY preamble of the PPDU includes payload information for the PS-Poll frame.

The payload information may be processed as a PS-Poll ACK frame if the PPDU type field indicates that the PHY preamble of the PPDU includes payload information for the PS-Poll ACK frame.

The payload information may be processed as a null data PPDU (NDP) announcement frame and the PPUD is processed as a NDP if the PPDU type field indicates that the PHY preamble of the PPDU includes payload information for the NDP announcement frame.

The PHY preamble may further include a fourth signal field following the third field, a second STF following the fourth signal field, a second LTF following the second STF, and the second LTF may be for channel estimation for sounding procedure.

The payload information may include at least one STA information field, each of the at least one STA information field containing STA-specific information for a STA which is intended to receive the NDP.

CRC and Tail fields may be appended to every N STA info field, N being an integer greater than 0.

The payload information may be included in the U-SIG.

The PHY preamble may further include a fourth signal field following the U-SIG field, and the payload information is included in the fourth signal field.

The PHY preamble further may include a fourth signal field following the U-SIG field, some of the payload information is included in the U-SIG and other of the payload information is included in the fourth signal field.

The one or more processors may be configured to further cause: transmitting another PPDU in response to the PPDU after a predetermined interframe space, wherein the predetermined interframe space is shorter than a Short IFS (SIFS).

One aspect of the present disclosure may provide a method performed by an electronic device for facilitating wireless communication, the method comprising: receiving a physical layer (PHY) protocol data unit (PPDU) including a PHY preamble including a first short training field (STF) corresponding to a non-high-throughput (Non-HT) short training field (L-STF), a first long training field (LTF) corresponding to a Non-HT long training field (L-LTF), a first signal field corresponding to a Non-HT signal (L-SIG) field, a second signal field corresponding to a repeated Non-HT signal (RL-SIG) field, and a third signal field corresponding to a universal signal (U-SIG) field; checking a control field in the PPDU, the control field indicating whether the PHY preamble in the PPDU carries payload information and the PPDU carries no data field carrying payload information; obtaining the payload information from the PHY preamble if the control field indicates that the PHY preamble in the PPDU includes the payload information and the PPDU carries no data field; and processing the payload information.

The method may further comprise: obtaining a PPDU type field from the PHY preamble, the PPDU type field indicating which payload information is included in the PHY preamble of the PPDU; and processing the payload information based on the PPDU type field.

One aspect of the present disclosure may provide an electronic device for facilitating wireless communication, comprising processing circuitry configured to cause: generating a physical layer (PHY) protocol data unit (PPDU) including a PHY preamble including a first short training field (STF) corresponding to a non-high-throughput (Non-HT) short training field (L-STF), a first long training field (LTF) corresponding to a Non-HT long training field (L-LTF), a first signal field corresponding to a Non-HT signal (L-SIG) field, a second signal field corresponding to a repeated Non-HT signal (RL-SIG) field, and a third signal field corresponding to a universal signal (U-SIG) field; and transmitting the PPDU, wherein the PPDU include a control field indicating whether the PHY preamble in the PPDU includes carries payload information and the PPDU carries no data field carrying payload information, the PHY preamble includes payload information if the control field indicates that the PHY preamble in the PPDU includes payload information and the PPDU carries no data field.

The payload information may include a PPDU type field indicating which payload information is included in the PHY preamble of the PPDU, if the control field indicates that the PHY preamble in the PPDU includes medium access control (MAC) information and the PPDU carries no data field.

DETAILED DESCRIPTION

Figure 1:
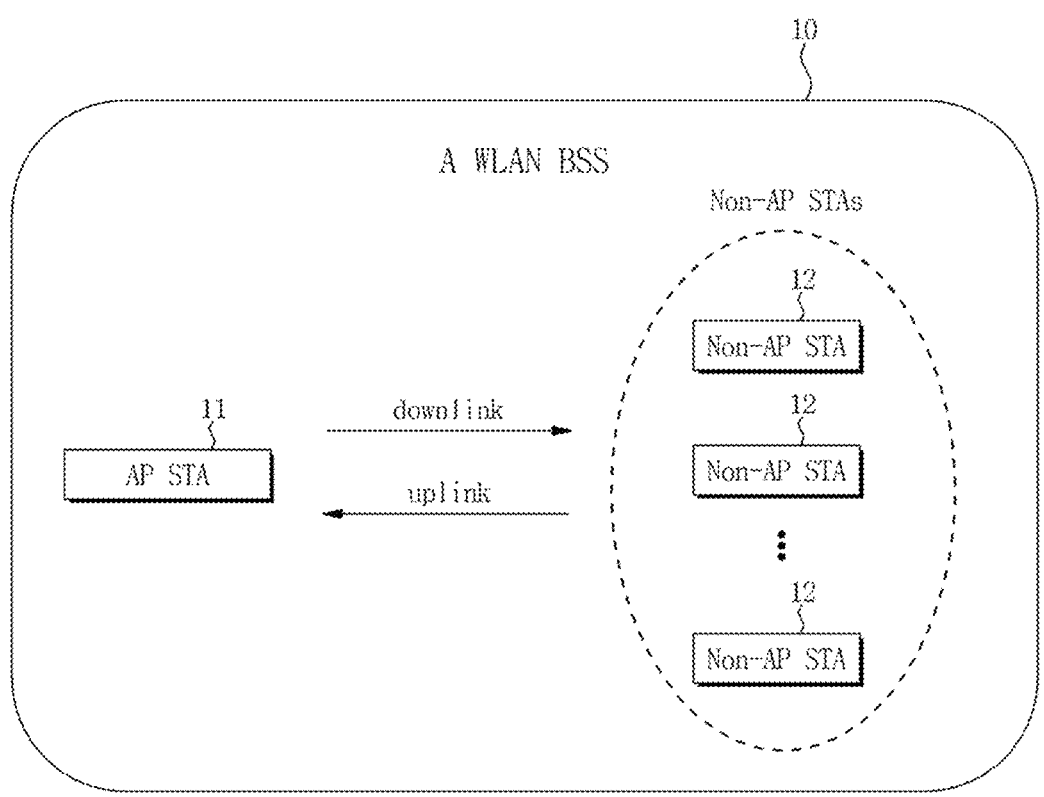
FIG. 1 illustrates a schematic diagram of an example wireless communication network.

The detailed description set forth below is intended to describe various implementations and is not intended to represent the only implementation. As those skilled in the art would realize, the described implementations may be modified in various different ways, all without departing from the scope of the present disclosure. Accordingly, the drawings and description are to be regarded as illustrative in nature and not restrictive. Like reference numerals designate like elements.

The below detailed description herein has been described with reference to a wireless LAN system according to the Institute of Electrical and Electronics Engineers (IEEE) 802.11 wireless standards including the current and future amendments. However, a person having ordinary skill in the art will readily recognize that the teachings herein are applicable to other network environments, such as cellular telecommunication networks and wired telecommunication networks.

In some embodiments, apparatus or devices such as an AP STA and a non-AP may include one or more hardware and software logic structure for performing one or more of the operations described herein. For example, the apparatuses or devices may include at least one memory unit which stores instructions that may be executed by a hardware processor installed in the apparatus and at least one processor which is configured to perform operations or processes described in the disclosure. The apparatus may also include one or more other hardware or software elements such as a network interface and a display device.

FIG. 1 illustrates a schematic diagram of an example wireless communication network.

Referring to FIG. 1, a basic service set (BSS) 10 may include a plurality of stations (STAs) including an access point (AP) station (AP STA) 11 and one or more non-AP station (non-AP STA) 12. The STAs may share a same radio frequency channel with one out of WLAN operation bandwidth options (e.g., 20/40/80/160/320 MHz). Hereinafter, in some embodiments, the AP STA and the non-AP STA may be referred as AP and STA, respectively. In some embodiments, the AP STA and the non-AP STA may be collectively referred as station (STA).

The plurality of STAs may participate in multi-user (MU) transmission. In the MU transmission, the AP STA 11 may simultaneously transmit the downlink frames to the multiple non-AP STAs 12 in the BSS 10 based on different resources and the multiple non-AP STAs 12 may simultaneously transmit the uplink frames to the AP STA 11 in the BSS 10 based on different resources.

For the MU transmission, multi-user multiple input, multiple output (MU-MIMO) transmission or orthogonal frequency division multiple access (OFDMA) transmission may be used. In MU-MIMO transmission, with one or more antennas, the multiple non-AP STAs 12 may either simultaneously transmit to the AP STA 11 or simultaneously receive from the AP STA 11 independent data streams over the same subcarriers. Different frequency resources may be used as the different resources in the MU-MIMO transmission. In OFDMA transmission, the multiple non-AP STAs 12 may either simultaneously transmit to the AP STA 11 or simultaneously receive from the AP STA 11 independent data streams over different groups of subcarriers. Different spatial streams may be used as the different resources in MU-MIMO transmission.

Figure 2:
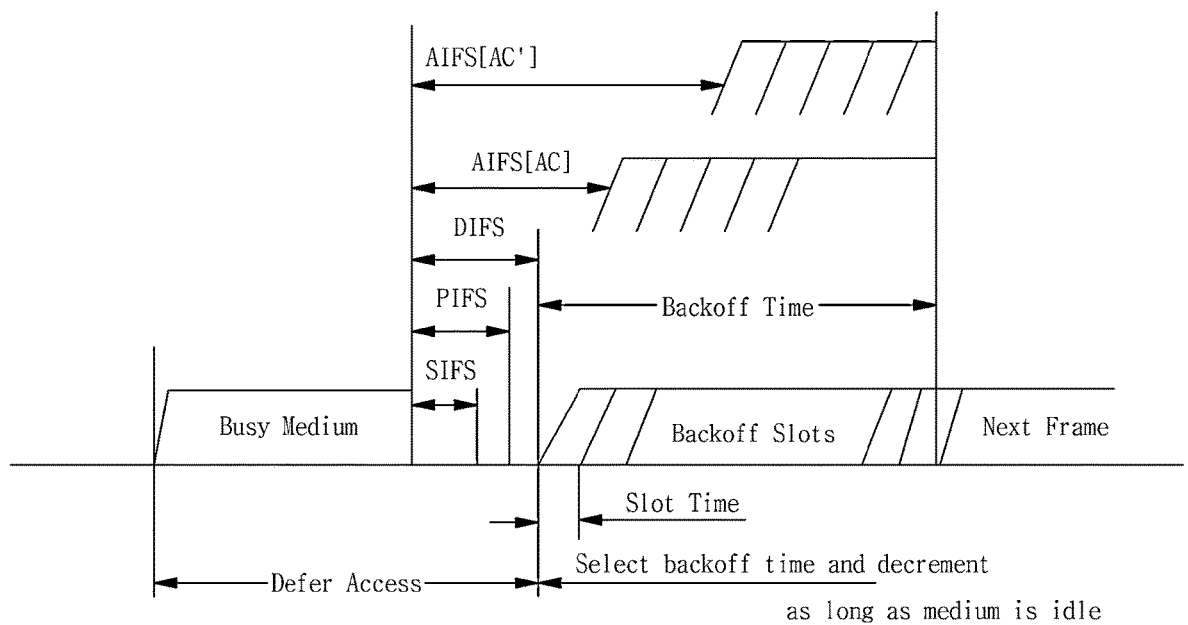
FIG. 2 illustrates an example of a timing diagram of interframe space (IFS) relationships between stations in accordance with an embodiment.

FIG. 2 illustrates an example of a timing diagram of interframe space (IFS) relationships between stations in accordance with an embodiment.

In particular, FIG. 2 shows a CSMA (carrier sense multiple access)/CA (collision avoidance) based frame transmission procedure for avoiding collision between frames in a channel.

A data frame, a control frame, or a management frame may be exchanged between STAs.

The data frame may be used for transmission of data forwarded to a higher layer. Referring to FIG. 2, access is deferred while the medium is busy until a type of IFS duration has elapsed. The STA may transmit the data frame after performing backoff if a distributed coordination function IFS (DIFS) has elapsed from a time when the medium has been idle.

The management frame may be used for exchanging management information which is not forwarded to the higher layer. Subtype frames of the management frame may include a beacon frame, an association request/response frame, a probe request/response frame, and an authentication request/response frame.

The control frame may be used for controlling access to the medium. Subtype frames of the control frame include a request to send (RTS) frame, a clear to send (CTS) frame, and an acknowledgement (ACK) frame. In the case that the control frame is not a response frame of the other frame, the STA may transmit the control frame after performing backoff if the DIFS has elapsed. If the control frame is the response frame of a previous frame, the WLAN device may transmit the control frame without performing backoff when a short IFS (SIFS) has elapsed. The type and subtype of frame may be identified by a type field and a subtype field in a frame control field.

On the other hand, a Quality of Service (QOS) STA may transmit the frame after performing backoff if an arbitration IFS (AIFS) for access category (AC), i.e., AIFS [AC] has elapsed. In this case, the data frame, the management frame, or the control frame which is not the response frame may use the AIFC [AC].

In some embodiments, a point coordination function (PCF) enabled AP STA may transmit the frame after performing backoff if a PCF IFS (PIFS) has elapsed. The PIFS duration may be less than the DIFS but greater than the SIFS.

Figure 3:
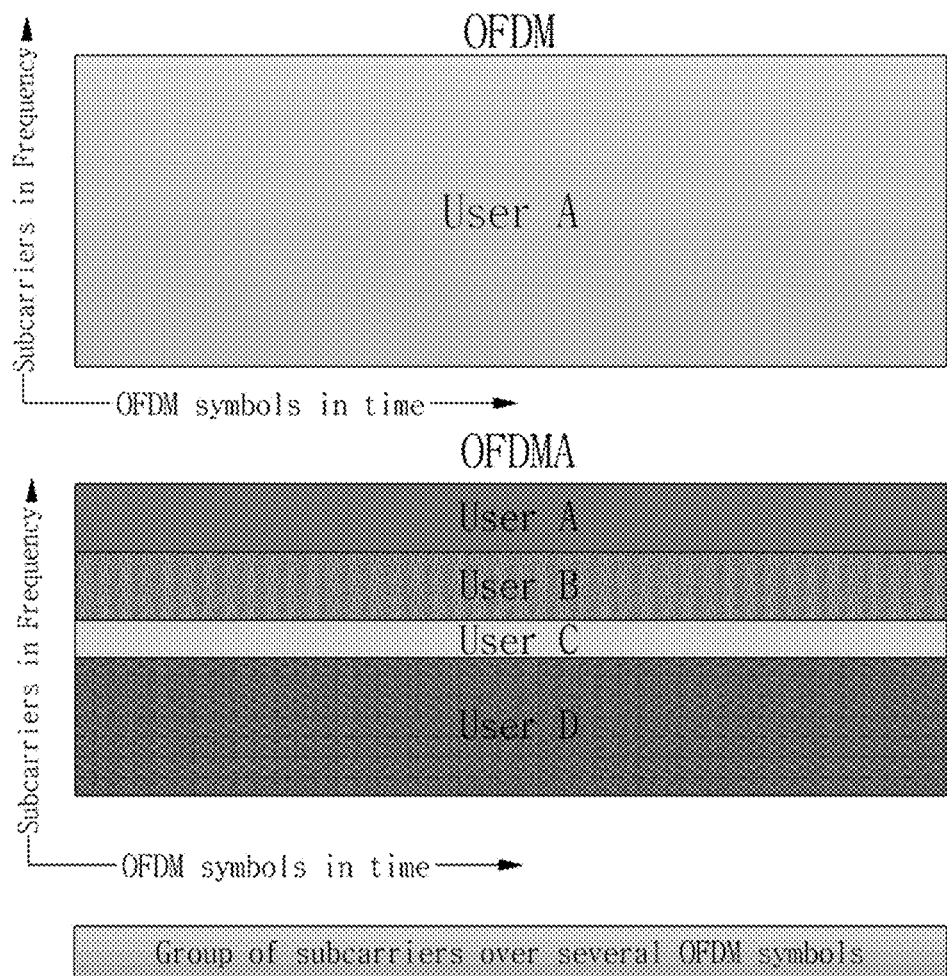
FIG. 3 shows an OFDM symbol and an OFDMA symbol in accordance with an embodiment.

FIG. 3 shows an OFDM symbol and an OFDMA symbol in accordance with an embodiment.

For multi-user access modulation, the orthogonal frequency division multiple access (OFDMA) for uplink and downlink has been introduced in IEEE 802.11ax standard known as High Efficiency (HE) WLAN and will be used in 802.11's future amendments such as EHT (Extreme High Throughput). One or more STAs may be allowed to use one or more resource units (RUs) throughout operation bandwidth to transmit data at the same time. As the minimum granularity, one RU may comprise a group of predefined number of subcarriers and be located at predefined location in orthogonal frequency division multiplexing (OFDM) modulation symbol. Here, non-AP STAs may be associated or non-associated with AP STA when responding simultaneously in the assigned RUs within a specific period such as a short inter frame space (SIFS). The SIFS may refer to the time duration from the end of the last symbol, or signal extension if present, of the previous frame to the beginning of the first symbol of the preamble of the subsequent frame.

The OFDMA is an OFDM-based multiple access scheme where different subsets of subcarriers may be allocated to different users, allowing simultaneous data transmission to or from one or more users with high accurate synchronization for frequency orthogonality. In OFDMA, users may be allocated different subsets of subcarriers which can change from one physical layer (PHY) protocol data unit (PPDU) to the next. In OFDMA, an OFDM symbol is constructed of subcarriers, the number of which is a function of the PPDU bandwidth. The difference between OFDM and OFDMA is illustrated in FIG. 3.

In case of UL MU transmission, given different STAs with their own capabilities and features, the AP STA may want to have more control mechanism of the medium by using more scheduled access, which may allow more frequent use of OFDMA/MU-MIMO transmissions. PPDUs in UL MU transmission (MU-MIMO or OFDMA) may be sent as a response to the trigger frame sent by the AP. The trigger frame may have STA's information and assign RUs and multiple RUs (MRUs) to STAs. The STA's information in the trigger frame may comprise STA Identification (ID), MCS (modulation and coding scheme), and frame length. The trigger frame may allow an STA to transmit trigger-based (TB) PPDU (e.g., HE TB PPDU or EHT TB PPDU) which is segmented into an RU and all RUs as a response of Trigger frame are allocated to the solicited non-AP STAs accordingly. Hereafter, a single RU and a multiple RU may be referred to as the RU. The multiple RU may include, or consist of, predefined two, three, or more RUs.

In EHT amendment, two EHT PPDU formats are defined: the EHT MU PPDU and the EHT TB PPDU. Hereinafter, the EHT MU PPDU and the EHT TB PPDU will be described with reference to FIG. 4A and FIG. 4B.

Figure 4A:
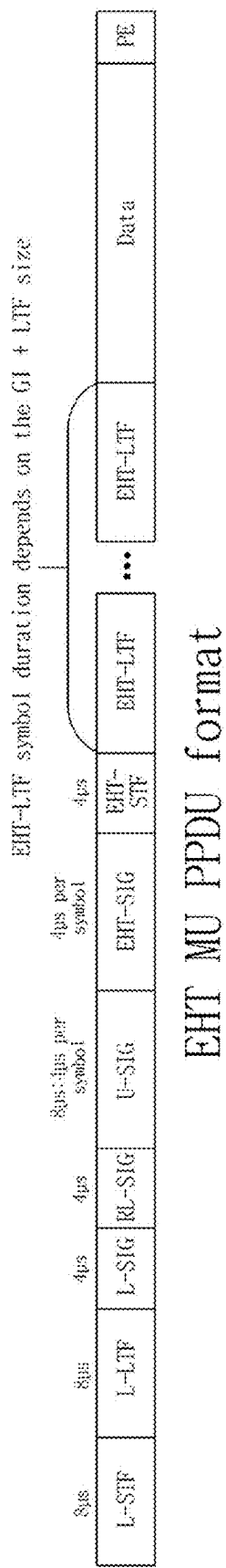
FIG. 4A illustrates the EHT MU PPDU format in accordance with an embodiment.

FIG. 4A illustrates the EHT MU PPDU format in accordance with an embodiment.

The EHT MU PPDU may be used for transmission to one or more users. The EHT MU PPDU is not a response to a triggering frame.

Referring to FIG. 4A, the EHT MU PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, a universal signal (U-SIG) field, and an EHT signal (EHT-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-SIG field immediately followed by the EHT-STF immediately followed by the EHT-LTF immediately followed by the data field immediately followed by the PE field.

The L-STF field may be utilized for packet detection, automatic gain control (AGC), and coarse frequency-offset correction.

The L-LTF field may be utilized for channel estimation, fine frequency-offset correction, and symbol timing.

The L-SIG field may be used to communicate rate and length information.

The RL-SIG field may be a repeat of the L-SIG field and may be used to differentiate an EHT PPDU from a non-HT PPDU, HT PPDU, and VHT PPDU.

The U-SIG field may carry information necessary to interpret EHT PPDUs.

The EHT-SIG field may provide additional signaling to the U-SIG field for STAs to interpret an EHT MU PPDU. Hereinafter, the U-SIG field, the EHT-SIG field, or both may be referred to as the SIG field.

The EHT-SIG field may include one or more EHT-SIG content channel. Each of the one or more EHT-SIG content channel may include a common field and a user specific field. The common field may contain information regarding the resource unit allocation such as the RU assignment to be used in the EHT modulated fields of the PPDU, the RUs allocated for MU-MIMO and the number of users in MU-MIMO allocations. The user specific field may include one or more user fields.

The user field for a non-MU-MIMO allocation may include a STA-ID subfield, a MCS subfield, a NSS subfield, a beamformed subfield, and a coding subfield. The user field for a MU-MIMO allocation may include a STA-ID subfield, a MCS subfield, a coding subfield, and a spatial configuration subfield.

The EHT-STF field may be used to improve automatic gain control estimation in a MIMO transmission.

The EHT-LTF field may enable the receiver to estimate the MIMO channel between the set of constellation mapper outputs and the receive chains.

The data field may carry one or more physical layer convergence procedure (PLCP) service data units (PSDUs).

The PE field may provide additional receive processing time at the end of the EHT MU PPDU.

Figure 4B:
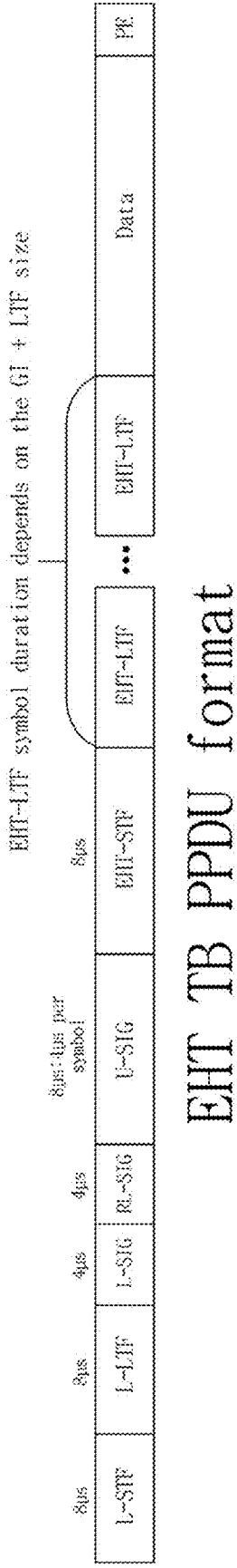
FIG. 4B illustrates the EHT TB PPDU format in accordance with an embodiment.

FIG. 4B illustrates the EHT TB PPDU format in accordance with an embodiment.

The EHT TB PPUD may be used for a transmission of a response to a triggering frame.

Referring to FIG. 4B, the EHT TB PPDU may include, or consist of, an EHT preamble (hereinafter referred to as a PHY preamble or a preamble), a data field, and a packet extension (PE) field. The EHT preamble may include, or consist of, pre-EHT modulated fields and EHT modulated fields. The pre-EHT modulated fields may include, or consist of, a Non-HT short training field (L-STF), a Non-HT long training field (L-LTF), a Non-HT signal (L-SIG) field, a repeated Non-HT signal (RL-SIG) field, and a universal signal (U-SIG) field. The EHT modulated fields may include, or consist of, an EHT short training field (EHT-STF) and an EHT long training field (EHT-LTF). In some embodiments, the L-STF may be immediately followed by the L-LTF immediately followed by the L-SIG field immediately followed by the RL-SIG field immediately followed by the U-SIG field immediately followed by the EHT-STF immediately followed by the EHT-LTF immediately followed by the data field immediately followed by the PE field. In the EHT TB PPUD, the EHT-SIG field is not present because the trigger frame conveys necessary information and the duration of the EHT_STF field in the EHT TB PPUD is twice the duration of the EHT-STF field in the EHT MU PPDU.

Description for each field in the EHT TB PPDU will be omitted because description for each field in the EHT MU PPDU is applicable to the EHT TB PPDU.

For EHT MU PPDU and EHT TB PPUD, when the EHT modulated fields occupy more than one 20 MHz channels, the pre-EHT modulated fields may be duplicated over multiple 20 MHz channels.

Hereinafter, electronic devices for facilitating wireless communication in accordance with various embodiments will be described with reference to FIG. 5.

Figure 5:
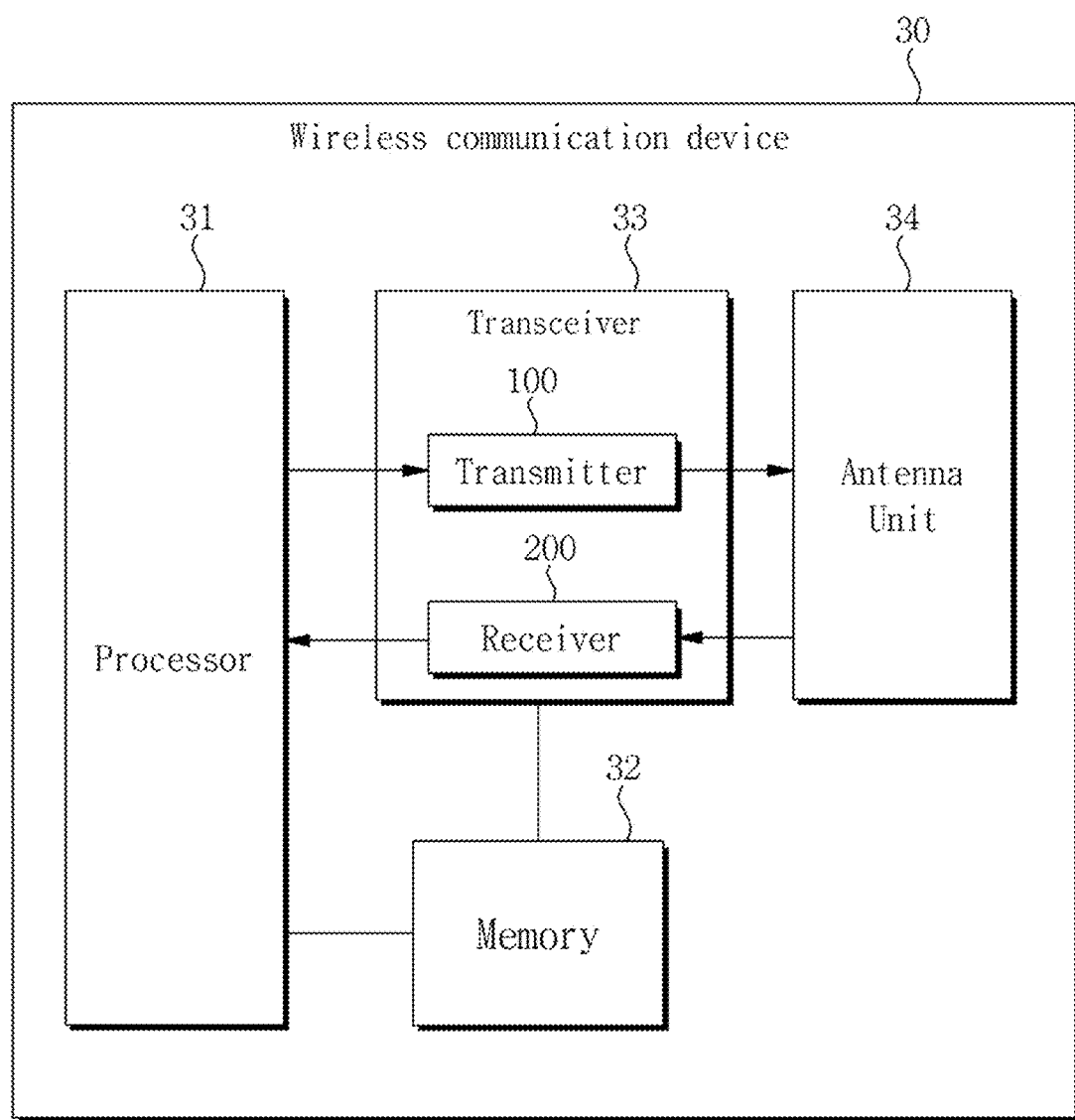
FIG. 5 is a block diagram of an electronic device for facilitating wireless communication in accordance with an embodiment.

FIG. 5 is a block diagram of an electronic device for facilitating wireless communication in accordance with an embodiment.

Referring to FIG. 5, an electronic device 30 for facilitating wireless communication in accordance with an embodiment may include a processor 31, a memory 32, a transceiver 33, and an antenna unit 34. The transceiver 33 may include a transmitter 100 and a receiver 200.

The processor 31 may perform medium access control (MAC) functions, PHY functions, RF functions, or a combination of some or all of the foregoing. In some embodiments, the processor 31 may comprise some or all of a transmitter 100 and a receiver 200. The processor 31 may be directly or indirectly coupled to the memory 32. In some embodiments, the processor 31 may include one or more processors.

The memory 32 may be non-transitory computer-readable recording medium storing instructions that, when executed by the processor 31, cause the electronic device 30 to perform operations, methods or procedures set forth in the present disclosure. In some embodiments, the memory 32 may store instructions that are needed by one or more of the processor 31, the transceiver 33, and other components of the electronic device 30. The memory may further store an operating system and applications. The memory 32 may comprise, be implemented as, or be included in a read-and-write memory, a read-only memory, a volatile memory, a non-volatile memory, or a combination of some or all of the foregoing.

The antenna unit 34 includes one or more physical antennas. When multiple-input multiple-output (MIMO) or multi-user MIMO (MU-MIMO) is used, the antenna unit 34 may include more than one physical antennas.

Figure 6:
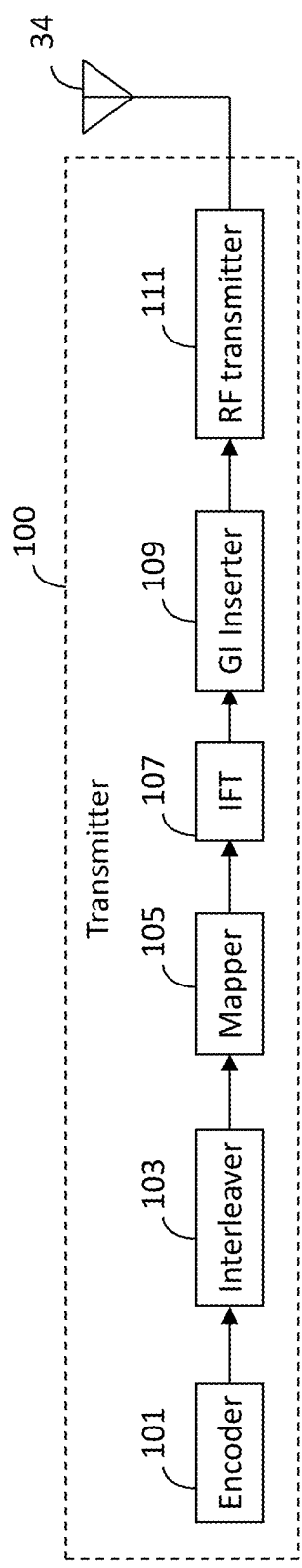
FIG. 6 shows a block diagram of a transmitter in accordance with an embodiment.

FIG. 6 shows a block diagram of a transmitter in accordance with an embodiment.

Figure 7:
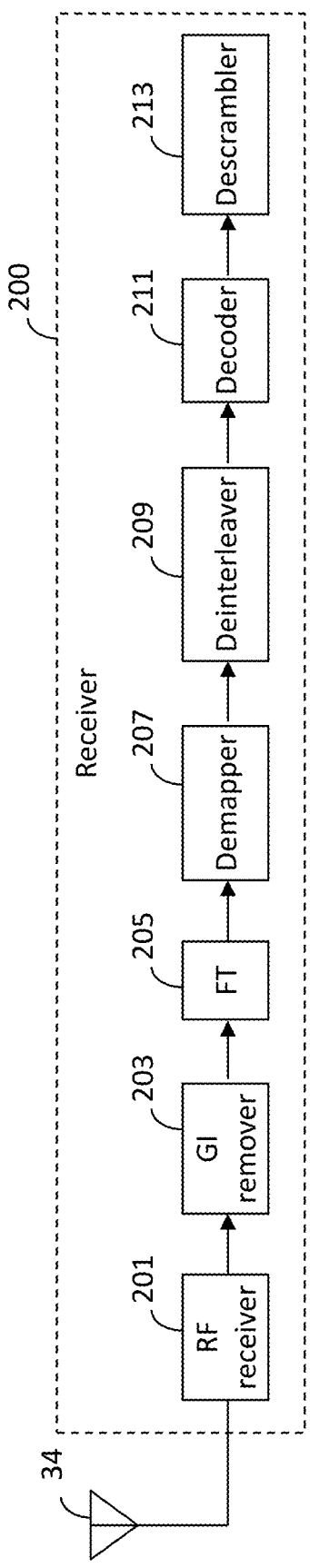
FIG. 7 shows a block diagram of a receiver in accordance with an embodiment.

Referring to FIG. 7, the transmitter 100 may include an encoder 101, an interleaver 103, a mapper 105, an inverse Fourier transformer (IFT) 107, a guard interval (GI) inserter 109, and an RF transmitter 111.

The encoder 101 may encode input data to generate encoded data. For example, the encoder 101 may be a forward error correction (FEC) encoder. The FEC encoder may include or be implemented as a binary convolutional code (BCC) encoder, or a low-density parity-check (LDPC) encoder.

The interleaver 103 may interleave bits of encoded data from the encoder 101 to change the order of bits, and output interleaved data. In some embodiments, interleaving may be applied when BCC encoding is employed.

The mapper 105 may map interleaved data into constellation points to generate a block of constellation points. If the LDPC encoding is used in the encoder 101, the mapper 105 may further perform LDPC tone mapping instead of the constellation mapping.

The IFT 107 may convert the block of constellation points into a time domain block corresponding to a symbol by using an inverse discrete Fourier transform (IDFT) or an inverse fast Fourier transform (IFFT).

The GI inserter 109 may prepend a GI to the symbol.

The RF transmitter 111 may convert the symbols into an RF signal and transmits the RF signal via the antenna unit 34.

FIG. 7 shows a block diagram of a receiver in accordance with an embodiment.

Referring to FIG. 7, the receiver 200 in accordance with an embodiment may include a RF receiver 201, a GI remover 203, a Fourier transformer (FT) 205, a demapper 207, a deinterleaver 209, and a decoder 211.

The RF receiver 201 may receive an RF signal via the antenna unit 34 and converts the RF signal into one or more symbols.

The GI remover 203 may remove the GI from the symbol.

The FT 205 may convert the symbol corresponding a time domain block into a block of constellation points by using a discrete Fourier transform (DFT) or a fast Fourier transform (FFT) depending on implementation.

The demapper 207 may demap the block of constellation points to demapped data bits. If the LDPC encoding is used, the demapper 207 may further perform LDPC tone demapping before the constellation demapping.

The deinterleaver 209 may deinterleave demapped data bits to generate deinterleaved data bits. In some embodiments, deinterleaving may be applied when BCC encoding is used.

The decoder 211 may decode the deinterleaved data bits to generate decoded bits. For example, the decoder 211 may be an FEC decoder. The FEC decoder may include a BCC decoder or an LDPC decoder. In order to support the HARQ procedure, the decoder 211 may combine a retransmitted data with an initial data.

The descrambler 213 may descramble the descrambled data bits based on a scrambler seed.

Link adaptation (LA) parameters for WLAN systems may be sent as part of the MAC header. The parameters may be carried in an HT control field in the MAC header. Hereinafter, the format of the MAC frame will be described with reference to FIGS. 10A, 10B, 11, 12, and 13.

In order to reduce the latency, the unnecessary overhead traffic or transmission may be removed. For example, WLAN system may support one or more PPDU types with no data field and critical information may be carried in SIG field instead of MAC frame.

Hereinafter, the formats of several new PPDUs in accordance with various embodiments will be described with reference to FIG. 8 to FIG. 13. The new PPDU may convey sensitive contents or information and will be called Time Sensitive PPUD (TS PPDU) in the disclosure.

Figure 8:
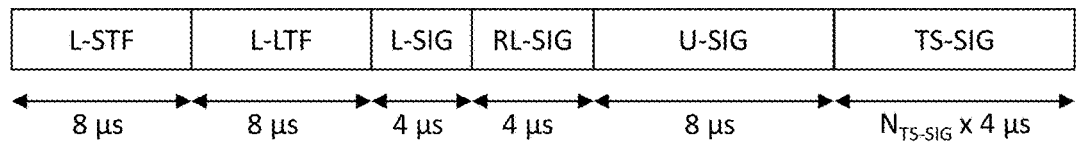
FIG. 8 shows a format of the TS PPUD in accordance with an embodiment.

FIG. 8 shows a format of the TS PPUD in accordance with an embodiment.

Referring to FIG. 8, the TS PPUD may include, or consist of, a L-STF, a L-LTF, a L-SIG field, a RL-SIG field, a U-SIG field, and a Time Sensitive signal (TS-SIG) field.

Figure 9:
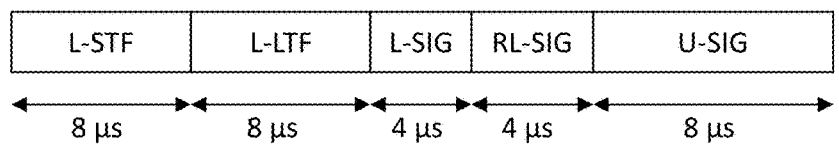
FIG. 9 shows a format of the TS PPUD in accordance with an embodiment.

FIG. 9 shows a format of the TS PPUD in accordance with an embodiment.

Referring to FIG. 9, the TS PPUD may include, or consist of, a L-STF, a L-LTF, a L-SIG field, a RL-SIG field, and a U-SIG field.

Figure 10:
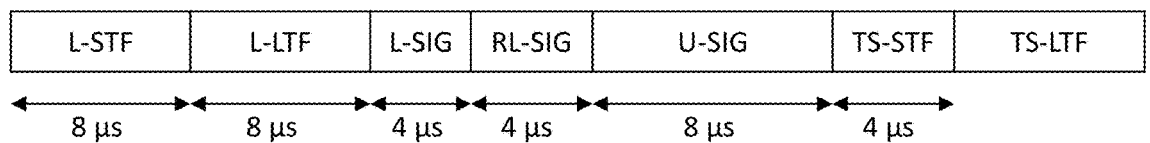
FIG. 10 shows a format of the TS PPUD in accordance with an embodiment.

FIG. 10 shows a format of the TS PPUD in accordance with an embodiment.

Referring to FIG. 10, the TS PPUD may include, or consist of, a L-STF, a L-LTF, a L-SIG field, a RL-SIG field, a U-SIG field, an EHT short training field (EHT-STF), and an EHT long training field (EHT-LTF).

Figure 11:
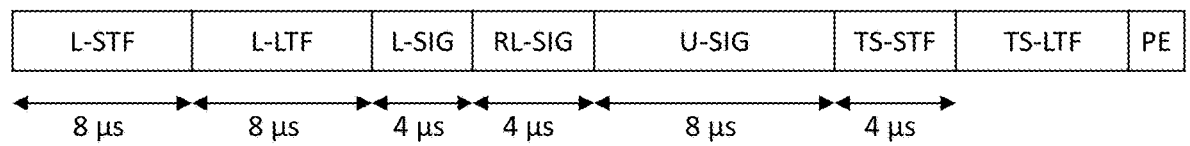
FIG. 11 shows a format of the TS PPUD in accordance with an embodiment.

FIG. 11 shows a format of the TS PPUD in accordance with an embodiment.

Referring to FIG. 11, the TS PPUD may include, or consist of, a L-STF, a L-LTF, a L-SIG field, a RL-SIG field, a U-SIG field, an EHT short training field (EHT-STF), an EHT long training field (EHT-LTF), and a packet extension (PE) field.

Figure 12:
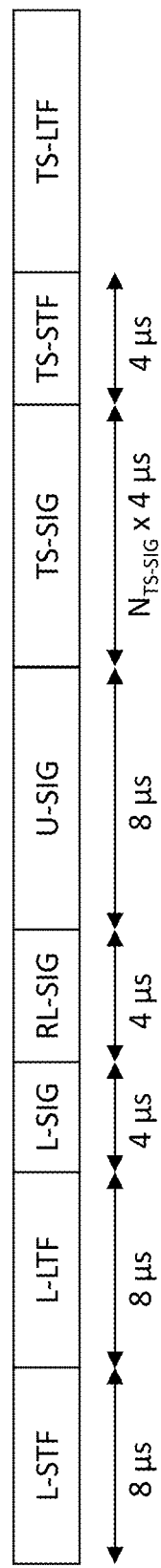
FIG. 12 shows a format of the TS PPUD in accordance with an embodiment.

FIG. 12 shows a format of the TS PPUD in accordance with an embodiment.

Referring to FIG. 12, the TS PPUD may include, or consist of, a L-STF, a L-LTF, a L-SIG field, a RL-SIG field, a U-SIG field, a Time Sensitive signal (TS-SIG) field, an EHT short training field (EHT-STF), and an EHT long training field (EHT-LTF).

Figure 13:
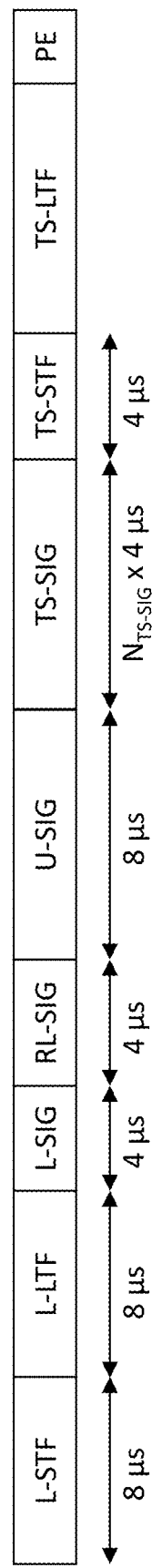
FIG. 13 shows a format of the TS PPUD in accordance with an embodiment.

FIG. 13 shows a format of the TS PPUD in accordance with an embodiment.

Referring to FIG. 13, the TS PPUD may include, or consist of, a L-STF, a L-LTF, a L-SIG field, a RL-SIG field, a U-SIG field, a Time Sensitive signal (TS-SIG) field, an EHT short training field (EHT-STF) an EHT long training field (EHT-LTF), and a packet extension (PE) field.

Description for the L-STF, the L-LTF, the L-SIG field and the RL-SIG field in the TS PPDUs with reference to FIG. 8 to FIG. 13 will be omitted if description for such fields in the EHT MU PPDU is applicable to the TS PPDUs.

Referring to FIG. 8 to FIG. 13, to increase the reliability of the U-SIG field, the TS-SIG, or both, power boosting may be applied to the L-STF, the L-LTF, or both. The boosting factor may be 3 dB. The TS-SIG field may be encoded with binary phase shift keying-dual carrier modulation (BPSK-DCM).

The U-SIG field may include two OFDM symbols (U-SIG-1 and U-SIG-2) with 52 bits. 20 bits (B0 to B19) in U-SIG-1 may be positioned as independent fields. The independent fields may be interpreted as intended for next amendment devices as well. The independent fields may contain PHY Version Identifier field, Bandwidth field, UL/DL field, BSS Color field, TXOP field. The PHY Version Identifier may identify the PHY version and differentiate between different PHY clauses. The Bandwidth field may indicate a bandwidth of the TS PPUD among a plurality of bandwidths including, for example, but not limited to, 20 MHz, 40 MHz, 80 MHz, 160 MHz, and 320 MHz. Two types of channelization for 320 MHz channel may be defined: 320 MHz-1 and 320 MHz-2. The 320 MHz-1 may refer to 320 MHz channel with channel center frequency numbered 31, 95, and 159. 320 MHz-2 may refer to 320 MHz channel with channel center frequency numbered 63, 127, and 191. The UL/DL field may indicate whether the PPDU is sent in uplink (UL) or downlink (DL) and set to the TXVECTOR parameter UPLINK_FLAG. The BSS Color field may indicate an identifier of the BSS and set to the TXVECTOR parameter BSS_COLOR. The TXOP field may indicate duration information for protection of this TXOP.

4 bits (B16 to B19) of cyclic redundancy code (CRC) field and 6 bits (B20-B25) of Tail field may be located in U-SIG-2. In order to distinguish whether it is one of TS PPDU formats or one of existing EHT PPDU formats, a control information may be included in U-SIG field. The control information could be located in one of reserved field. For example, the control information may be B25 corresponding to Validate field. B25 may be set to 0 to indicate whether a EHT STA stops the decoding further after U-SIG since the contents should be differently interpreted so the STA doesn't decode it correctly. In some embodiments, the control information may be indicated with PHY Version Identifier since the PHY Version Identifier differentiates between different PHY clauses. The control information may set to 0 for EHT and set to a predetermined value other than 0 for TS PPDU. In some embodiments, the control information may be carried in the TS-SIG field. In some embodiments, the TS PPDU may not include independent fields. When the control information in a PPUD indicates that the PPDU corresponds to the TS PPDU, for example, the PPDU may not include the independent fields but fields differently interpreted from fields in the EHT PPDU. The STA which supports the newly designed TS PPDU format may interpret the fields in U-SIG/EHT-SIG differently comparing to the fields in the EHT PPDU.

In some embodiments, the TS-SIG field may be encoded with various MCSs and a TS-SIG MCS field could be included in U-SIG field. The TS-SIG MCS field may indicate an MCS of the TS-SIG field among a plurality of MCSs including binary phase shift keying (BPSK) ½, quadrature phase shift keying (QPSK) ½, 16 quadrature amplitude modulation (16 QAM) ½ or BPSK-DCM ½. In some embodiments, the TS-SIG field may be encoded with fixed MCS. For example, the fixed MCS may be BPSK ½.

In some embodiments, the TS-SIG field may include, or consist of the various number of OFDM symbols and a field may be included in U-SIG to indicate the number of OFDM symbol in the TS-SIG. In some embodiments, the number of OFDM symbol in the TS-SIG field or the length of the TS-SIG field may be fixed. For example, the number of OFDM symbols of the TS-SIG field may be 4.

The fields in the U-SIG field or the TS-SIG field or both may be used to carry payload information which is included in the data field if the TS PPDU includes the data field.

Referring to FIG. 10 to FIG. 13, the length of the TS-STF may be 4 us or 8 us.

The TS-STF field may be included in the TS PPDU to improve automatic gain control estimation in a MIMO transmission. The TS-LTF field may provide a means for the receiver to estimate the MIMO channel between the set of constellation mapper outputs and the receive chains. In some embodiments, the TS-LTF may support one specific GI duration and TS-LTF size. In some embodiments, the TS-LTF may support a set of GI durations and TS-LTF sizes. In order to indicate the GI duration and the TS-LTF size of the TS-LTF, the GI+LTF Size field could be carried in TS-SIG field. For example, combinations of the GI duration and the TS-LTF size for the TS-LTF may include 2×LTF+0.8 μs GI, 2×LTF+1.6 μs GI, 4×LTF+0.8 μs GI, and 4×LTF+3.2 μs GI. In order to indicate the number of TS-LTF symbols included in the TS-LTF field, the Number of TS-LTF Symbols field may be included in the TS-SIG field. For example, the number of TS-LTF may be 1, 2, 4, 6, 8, 10, 12, 14, and 16.

The generation of the time domain symbol of the 2xTS-LTF is equivalent to modulating every other subcarrier in an OFDM symbol of 12.8 us excluding GI and then transmitting only the first half of the OFDM symbol in time domain.

As shown in FIG. 11 and FIG. 13, when the receiver requires extra time to decode TS PPDU, then Packet Extension (PE) field may be added at the end of the TS-PPDU. In some embodiments, the length of the PE field may be decided with the capabilities of the receiver STA when the receiver STA is associated with AP. The length of the PE field may be 4 us, 8 us, 12 us, 16 us, or 20 us. In some embodiments, the length of PE field may be fixed in TS PPDU. For example, the fixed length may be 4 us.

Referring to FIG. 8, FIG. 12 and FIG. 13, the TS-SIG field may provide space to carry payload information which is included in the data field if the TS PPDU includes the data field.

When the TS-SIG field is modulated with BPSK½, the TS-SIG field may provide up to the number of bits corresponding to 26×the number of TS-SIG OFDM symbols. For example, when the TS-SIG field includes 32 TS-SIG OFDM symbols, the TS-SIG field may carry 104 bytes.

When the TS-SIG field modulated with QPSK½, the TS-SIG field may provide up to the number of bits corresponding to 52×the number of TS-SIG OFDM symbols. For example, when the TS-SIG field includes 32 TS-SIG OFDM symbols are supported, the TS-SIG field may carry 208 bytes.

When the TS-SIG field modulated with 16QAM½, the TS-SIG field may provide up to the number of bits corresponding to 104×the number of TS-SIG OFDM symbols. For example, when the TS-SIG field includes 32 TS-SIG OFDM symbols are supported, the TS-SIG field may carry 416 bytes.

In some embodiments, when the length of the TS-SIG field is long, CRC fields and Tail fields may be located regularly. For example, TS PPDU (e.g. TS PPDU in FIG. 10, FIG. 11, FIG. 12 or FIG. 13) could be used to support the sounding procedure as shown in FIG. 16, FIG. 17, FIG. 18 and FIG. 19. The frame exchange sequences for single user transmission (non-TB type transmission) and multiple user transmission (TB type transmission) are shown in FIG. 16, FIG. 17, FIG. 18 and FIG. 19, respectively wherein NDPA, NDP, CQI, BFRP mean NDP announcement, Null Data Packet, Channel Quality Indicator, and Beam Forming Report Poll.

Hereinafter, the TS MAC data format will be described with reference to FIG. 14 and FIG. 15. The TS MAC data may be included in in the U-SIG field or the TS-SIG field. Some of the TS MAC data may be included in the U-SIG field and the rest may be included in the TS-SIG field.

Figure 14:
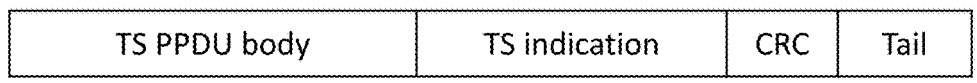
FIG. 14 shows a TS MAC data format according to an embodiment.

FIG. 14 shows a TS MAC data format according to an embodiment.

As shown in FIG. 14, the TS MAC data format may include a TS PPDU body field, a TS indication field, a CRC field and a Tail field. The TS PPDU body field may carry payload information which is included in the data field if the TS PPDU includes the data field. The TS indication field may indicate whether a PPDU is interpreted as the TS PPDU.

Figure 15:
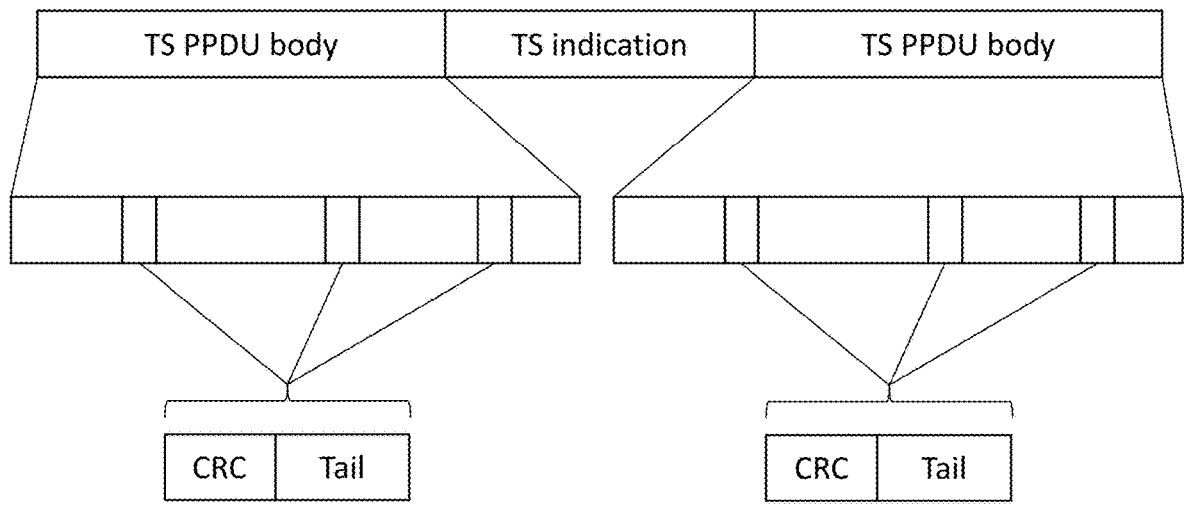
FIG. 15 shows a TS MAC data format according to an embodiment.

FIG. 15 shows a TS MAC data format according to an embodiment.

As shown in FIG. 15, TS MAC data format may include two TS PPDU body part fields separated by a TS indication field. Two TS PPDU body part fields may form a TS PPDU body field carrying payload information which is included in the data field if the TS PPDU includes the data field. A plurality of groups of a CRC field and a Tail field may be regularly appended to the predefined locations. For example, the CRC field and the Tail field may be appended to every N bit, or appended to every M Station-specific information field. Here, N and M are non-zero integers. The TS indication field may indicate whether a PPDU is interpreted as the TS PPDU.

Hereinafter, sounding sequences in accordance with various embodiments will be described with reference to FIG. 16 to FIG. 19. The beamformer may be an AP STA or a non-AP STA. The beamformee may be an AP STA or a non-AP STA.

Figure 16:
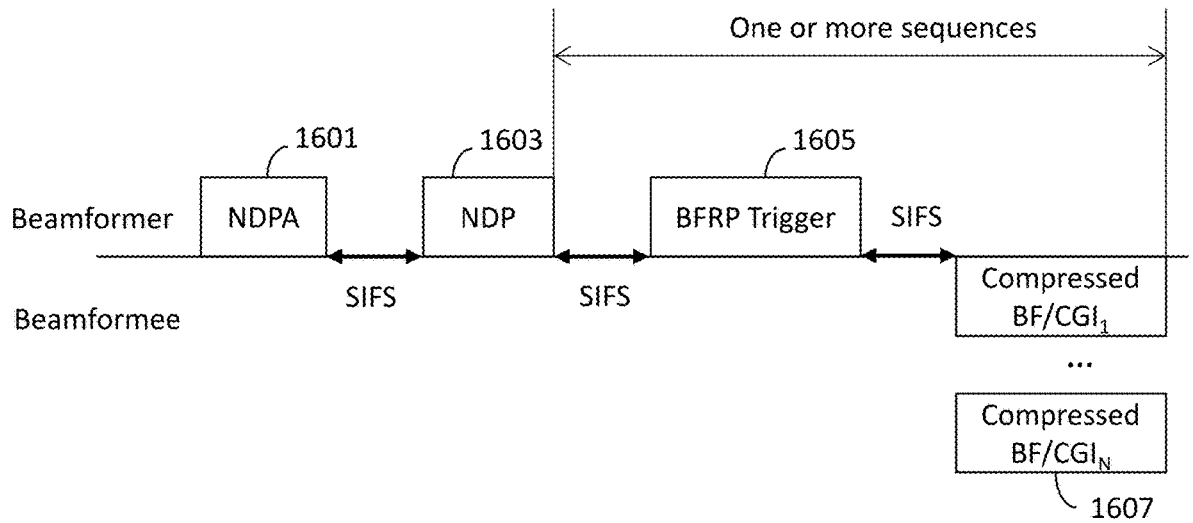
FIG. 16 shows a TB sounding sequence with one or more beamformees in accordance with an embodiment.

FIG. 16 shows a TB sounding sequence with one or more beamformees in accordance with an embodiment.

As shown in FIG. 16, in operation 1601, the beamformer may transmit a null data PPDU (NDP) announcement (NDPA) frame to one or more beamformees.

In operation 1603, the beamformer may transmit a NDP to the one or more beamformees a SIFS after the NDPA frame.

In operation 1605, the beamformer may transmit a beamforming report poll (BFRP) trigger frame to the one or more beamformees a SIFS after the NDP.

In operation 1607, each of the one or more beamformees may responds a SIFS after the BFRP trigger frame with a compressed beamforming/CQI frame including channel status information determined by the each of the one or more beamformees.

Figure 17:
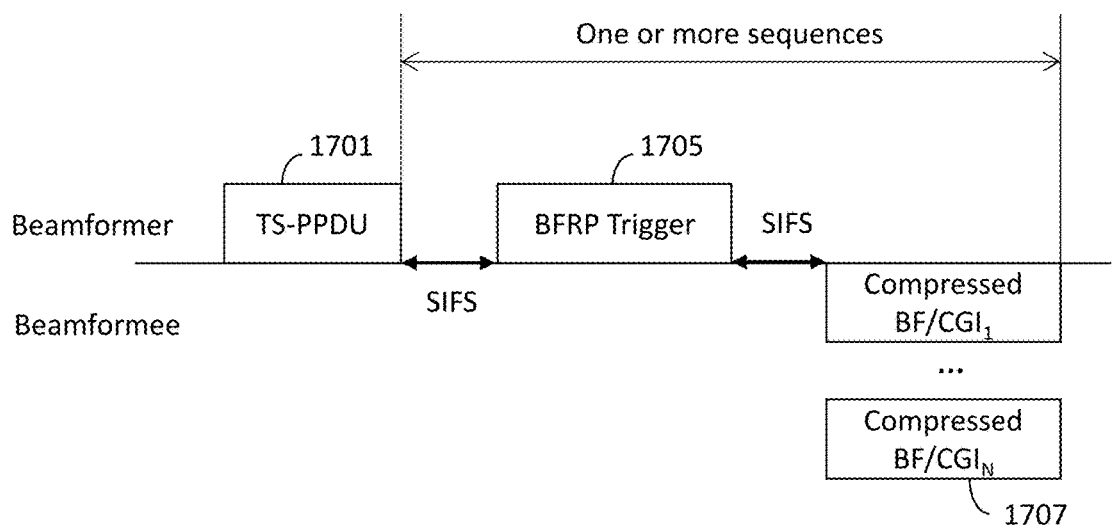
FIG. 17 shows a TB sounding sequence with a plurality of beamformees in accordance with an embodiment.

FIG. 17 shows a TB sounding sequence with a plurality of beamformees in accordance with an embodiment.

In operation 1701, the beamformer may transmit a TS PPUD to one or more beamformees.

In operation 1705, the beamformer may transmit a beamforming report poll (BFRP) trigger frame to the one or more beamformees a SIFS after the TS PPDU frame.

In operation 1707, each of the one or more beamformees may responds a SIFS after the BFRP trigger frame with a compressed beamforming/CQI frame including channel status information determined by the each of the one or more beamformees.

As shown in FIG. 17, the NDPA frame and the NDP of FIG. 16 may be replaced with the TS PPDU. The TS PPDU may include the TS-STF field and the TS-LTF field equivalent to NDP PPDU of FIG. 16 for channel estimation for sounding procedure. The TS PPDU may provide enough space to include essential information similar with information included in the NDPA frame of FIG. 16.

Figure 18:
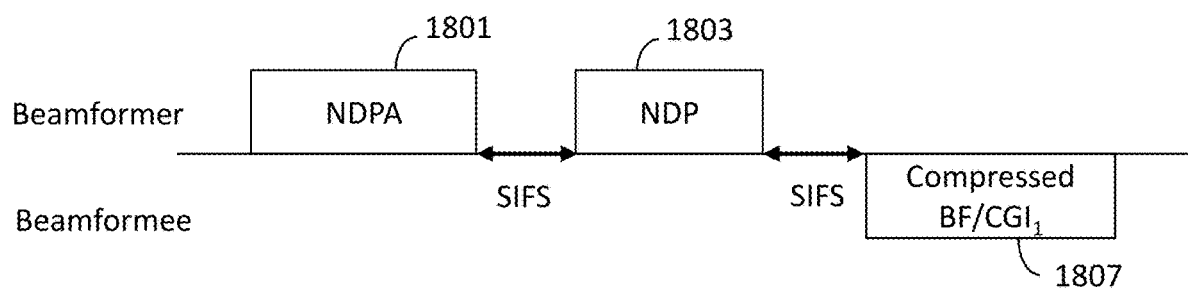
FIG. 18 shows a non-TB sounding sequence with a single beamformee in accordance with an embodiment.

FIG. 18 shows a non-TB sounding sequence with a single beamformee in accordance with an embodiment.

As shown in FIG. 18, in operation 1801, the beamformer may transmit a null data PPDU (NDP) announcement (NDPA) frame to a beamformee.

In operation 1803, the beamformer may transmit a NDP to the beamformee a SIFS after the NDPA FRAME.

In operation 1807, the beamformee may responds a SIFS after the NDP with a compressed beamforming/CQI frame including channel status information determined by the beamformee.

Figure 19:
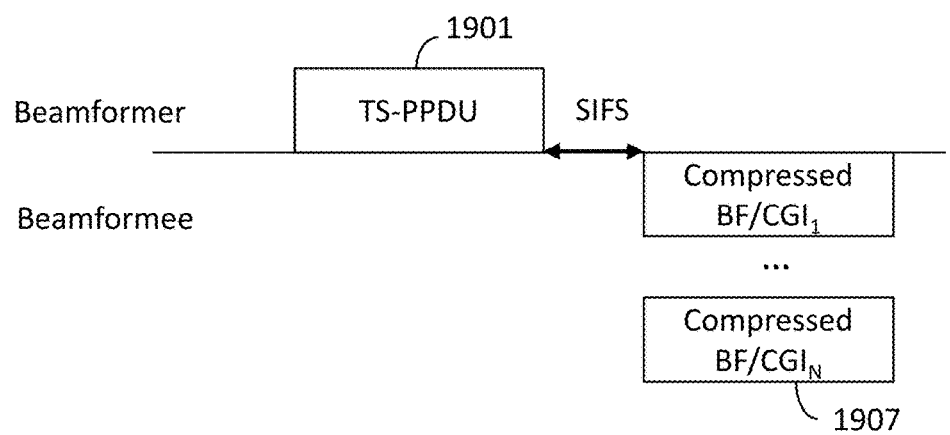
FIG. 19 shows a non-TB sounding sequence with a single beamformee in accordance with an embodiment.

FIG. 19 shows a non-TB sounding sequence with a single beamformee in accordance with an embodiment.

As shown in FIG. 19, in operation 1901, the beamformer may transmit a TS PPDU to a beamformee.

In operation 1907, the beamformee may responds a SIFS after the TS PPDU frame with a compressed beamforming/CQI frame including channel status information determined by the beamformee.

As shown in FIG. 19, the NDPA frame and the NDP of FIG. 18 may be replaced with the TS PPDU. The TS PPDU may include the TS-STF field and the TS-LTF field equivalent to NDP PPDU of FIG. 18 for channel estimation for sounding procedure. The TS PPDU may provide enough space to include essential information similar with information included in the NDPA frame of FIG. 18.

Hereinafter, information fields included in the NDPA frame and the TS-PPDU will be described with reference to FIG. 20.

Figure 20:
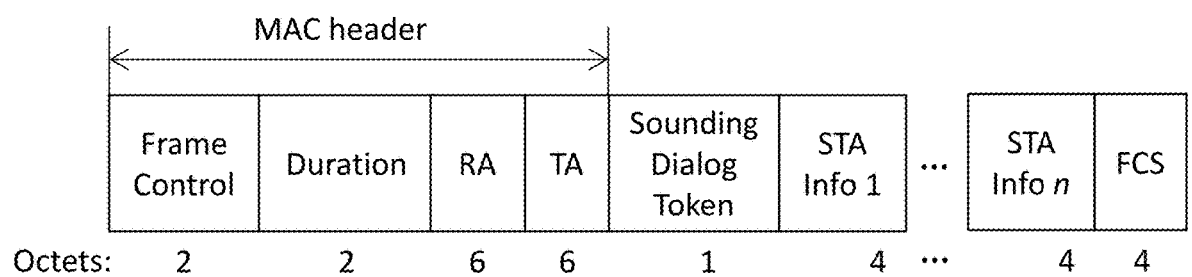
FIG. 20 shows an NDPA frame format in accordance with an embodiment.

FIG. 20 shows an NDPA frame format in accordance with an embodiment.

As shown in FIG. 20, the NDPA frame may include a frame control field, a duration field, a receiver address (RA) field, a transmitter address (TA) field, a Sounding Dialog Token field, one or more STA info fields, and an FCS field. All or some fields in the NDPA frame may be included in the TS PPUD as the payload information.

The RA field may be set to the address of the STA that can provide feedback, if the NDP Announcement frame contains only one STA Info field. The RA field may be set to the broadcast address, if the NDP Announcement frame contains more than one STA Info field.

The TA field may be set to the address of the STA transmitting the NDP Announcement frame or the bandwidth signaling TA of the STA transmitting the NDP Announcement frame.

The Sounding Dialog Token field may include an HE subfield and a Ranging subfield. Both of HE subfield and Ranging subfield in the Sounding Dialog Token field may be set to 0 to identify the frame as a VHT NDP Announcement frame. The HE subfield and Ranging subfield may be set to 1 and 0 respectively to identify the frame as an HE NDP Announcement frame. The HE subfield and Ranging subfield may be set to 1 to identify the frame as a an EHT NDP Announcement frame.

In some embodiments, the U-SIG, TS-SIG field, or both may include entire or partial information of NDPA. In order to increase reliability and not to make the STAs to wait long to have its STA specific information from its STA Info field, CRC fields and Tail fields may be appended to the predefined location in the U-SIG, TS-SIG field, or both. In some embodiments, CRC and Tail fields are appended to every N STA info field (N is an integer greater than 0). For example, when the TS-SIG field include 8 STA info fields and N is equal to 2, the TS-SIG field may include a STA Info 1, a STA Info 2, a CRC, a Tail, a STA Info 3, STA Info 4, a CRC, a Tail, a STA Info 5, a STA Info 6, a CRC, a Tail, a STA Info 7, STA Info 8, a CRC, and a Tail.

The TS-SIG may include FCS field as shown in FIG. 20 to see whether entire information is correctly decoded or not. The length of FCS field may be 4 octets.

In order to support different types of information carried in TS PPDU, there is a control field in U-SIG or EHT-SIG. The control field may be a PPDU Type field. For example, the PPDU Type field may be set to a first value to indicate that the information corresponding to sounding sequence is carried in TS PPDU. The PPDU Type field may be set to a second value to indicate that information of a PS-Poll frame is carried in TS PPDU. The PPDU Type field may be set to a third value to indicate that information of an ACK frame is carried in TS PPDU. The PPDU Type field may be set to a fourth value to indicate that information of a PS-Poll ACK frame is carried in TS PPDU. The PPDU Type field may be set to a fifth value to indicate that information of a Block-ACK frame is carried in TS PPDU.

Hereinafter, power management in accordance with an embodiment will be described with reference to FIG. 21.

Figure 21:
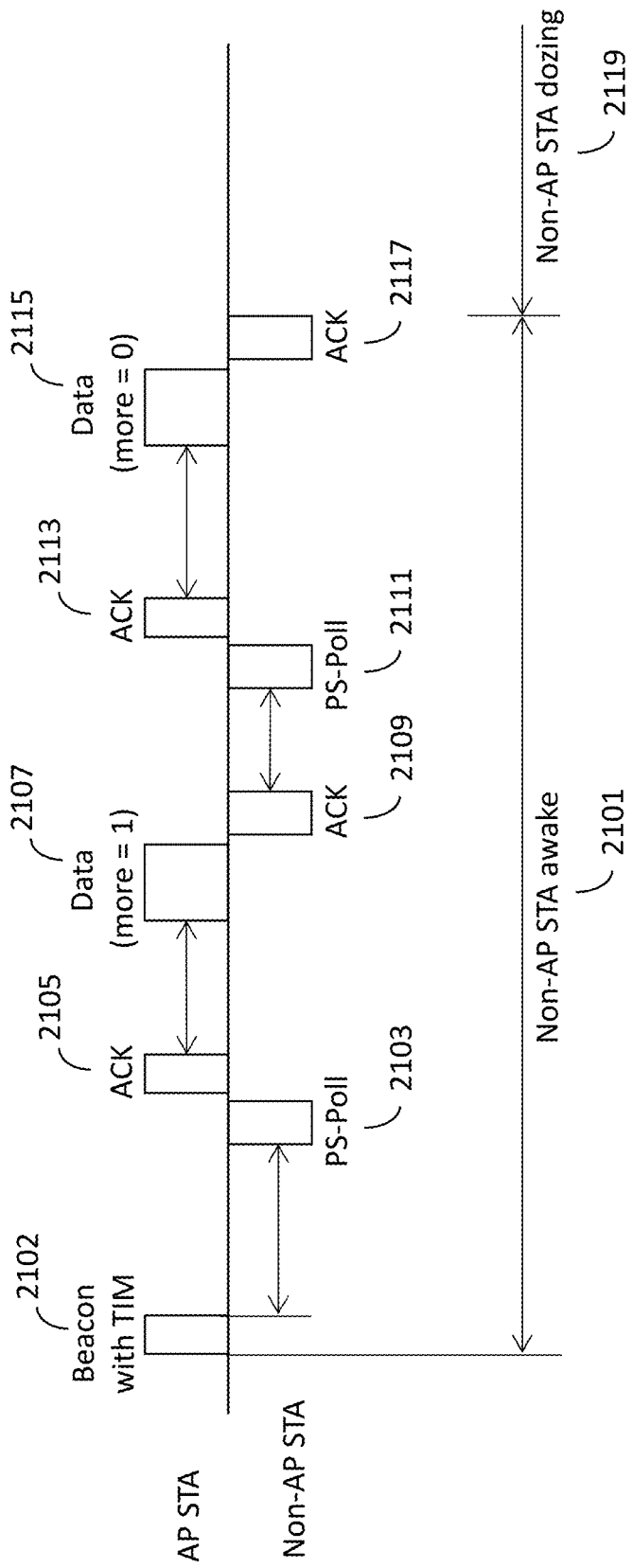
FIG. 21 shows a frame exchange for power management.

FIG. 21 shows a frame exchange for power management.

In 2101, the non-AP STA may awake to receive the beacon frame.

In 2102, the AP STA may broadcast the beacon frame.

In 2103, when the non-AP STA detects that the bit corresponding to its AID is 1 in the TIM of the received beacon frame, the non-AP STA may transmit a PS-Poll frame to the AP STA. The non-AP STA may remain in the awake state until it receives the bufferable unit in response to the PS-Poll frame.

In 2105, the AP STA may send a PS-Poll ACK frame a SIFS after the PS-Poll frame in response to the PS-Poll frame to indicate that the AP STA successfully has received the PS-Poll frame.

In 2107, the AP STA may send a Data frame in response to the PS-Poll frame.

In 2109, the non-AP STA may send an ACK frame a SIFS after the Data frame in response to the Data frame to indicate that the non-AP STA successfully has received the Data frame.

In 2111, the non-AP STA may send a PS-Poll frame in response to the Data frame having a More Data bit set equal to 1.

In 2113, the AP STA may send a PS-Poll ACK frame a SIFS after the PS-Poll frame in response to the PS-Poll frame to indicate that the AP STA successfully has received the PS-Poll frame.

In 2115, the AP STA may send a Data frame in response to the PS-Poll frame.

In 2117, the non-AP STA may send an ACK frame a SIFS after the Data frame in response to the Data frame to indicate that the non-AP STA successfully has received the Data frame.

In 2119, the non-AP STA may enter into a doze state in response to the Data frame having a More Data bit set equal to 0.

Figure 22:
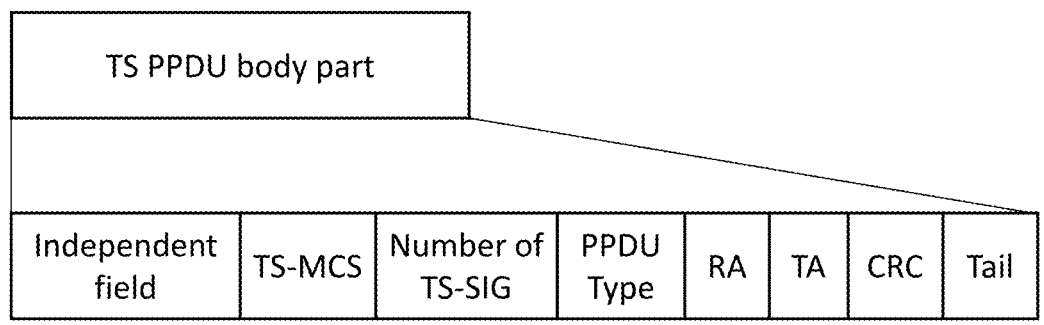
FIG. 22 shows a format of a TS PPDU body part carrying a PS-Poll frame in accordance with an embodiment.

FIG. 22 shows a format of a TS PPDU body part carrying a PS-Poll frame in accordance with an embodiment.

As shown in FIG. 22, the TS PPDU body part carrying the PS-Poll frame may include the independent fields as described above, a TS-MCS field, a number of TS-SIG symbols field, a PPDU Type field, a RA field, a TA field, a CRC field, and a Tail field.

The TS-MCS field may indicate an MCS of some part of the TS PPDU body. In some embodiments, some of the TS PPUD body may be included in the U-SIG field, the rest of the TS PPDU body may be included in the TS-SIG field, and TS-MCS field may indicate the MCS of the TS-SIG field.

The number of TS-SIG symbols field may indicate the number of the TS-SIG fields.

The PPDU Type field may indicate the type of the TS PPDU, for example, but not limited to, among a plurality of frames including a PS-Poll frame, an ACK frame, a PS-Poll ACK frame and a BlockACK frame. The plurality of frames may be control frames, management frames, or time-sensitive frames.

The RA field may be set to the address of the STA contained in the AP.

The TA field value may be set to the address of the STA transmitting the frame or a bandwidth signaling TA. In a PS-Poll frame transmitted by a VHT STA in a non-HT or non-HT duplicate format and where the scrambling sequence carries the TXVECTOR parameter CH_BAND-WIDTH_IN_NON_HT, the TA field value may be a bandwidth signaling TA.

The CRC field may be used as a check sequence to protect the fields that precede the CRC field.

The Tail field may be six bits of 0, which are required to return the convolutional encoder to the zero state.

In some embodiments, if a STA receives a PPDU, the STA may check the TS indication field in the PPDU. If the TS indication field in the PPDU indicates that the PPDU is the TS PPDU, the STA may check the PPDU Type field. If the PPDU Type field indicates that the TS PPDU includes a TS PPDU body part carrying the PS-Poll frame, the STA may interpret the TS PPDU as including the independent fields, the TS-MCS field, the number of TS-SIG symbols field, the PPDU Type field, the RA field, the TA field, the CRC field, and the Tail field.

Figure 23:
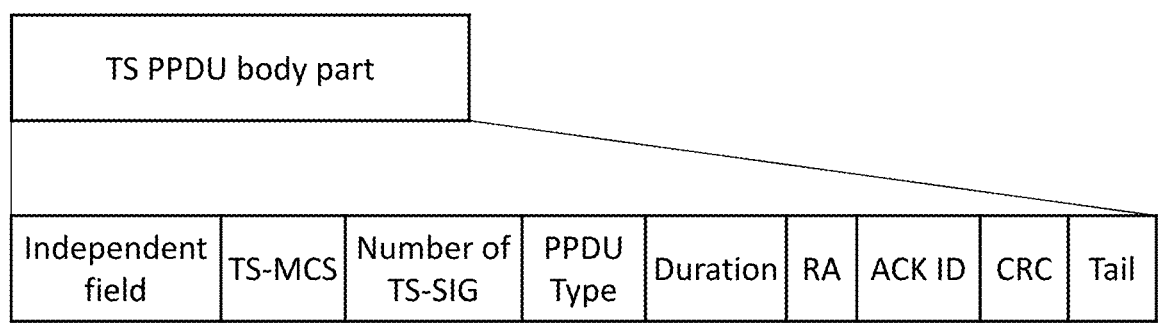
FIG. 23 shows a format of a TS PPDU body part carrying an ACK frame in accordance with an embodiment.

FIG. 23 shows a format of a TS PPDU body part carrying an ACK frame in accordance with an embodiment.

As shown in FIG. 23, the TS PPDU body part carrying the ACK frame may include the independent fields as described above, a TS-MCS field, a number of TS-SIG symbols field, a PPDU Type field, a Duration field, a RA field, an ACK ID field, a CRC field, and a Tail field.

The TS-MCS field may indicate an MCS of some part of the TS PPDU body. In some embodiments, some of the TS PPUD body may be included in the U-SIG field, the rest of the TS PPDU body may be included in the TS-SIG field, and TS-MCS field may indicate the MCS of the TS-SIG field.

The number of TS-SIG symbols field may indicate the number of the TS-SIG fields.

The PPDU Type field may indicate the type of the TS PPDU, for example, but not limited to, among a plurality of frames including a PS-Poll frame, an ACK frame, a PS-Poll ACK frame and a BlockACK frame. The plurality of frames may be control frames, management frames, or time-sensitive frames.

For Ack frames sent by non-QoS STAs, if the More Fragments bit was equal to 0 in the Frame Control field of the immediately previous individually addressed Data or Management frame, the Duration field may be set to 0. In other Ack frames sent by non-QoS STAs, the Duration field may be the value obtained from the Duration/ID field of the immediately previous Data, Management, BlockAckReq, or BlockAck frame minus the time, in microseconds, required to transmit the Ack frame and its SIFS. If the calculated duration includes a fractional microsecond, that value may be rounded up to the next higher integer.

The RA field may be set to the address of the STA contained in the AP.

The Ack ID field may be defined based on value of scrambler initialization and value of FCS. For example, the Ack ID field may be set to the bit sequence Scrambler Initialization [0:6] || FCS [30:31] obtained from the scrambler initialization value in the Service field prior to descrambling, and the FCS field of the PSDU that carries the soliciting frame. The scrambler initialization value may be obtained from the RXVECTOR parameter SCRAMBLER_OR_CRC.

The CRC field may be used as a check sequence to protect the fields that precede the CRC field.

The Tail field may be six bits of 0, which are required to return the convolutional encoder to the zero state.

In some embodiments, if a STA receives a PPDU, the STA may check the TS indication field in the PPDU. If the TS indication field in the PPDU indicates that the PPDU is the TS PPDU, the STA may check the PPDU Type field. If the PPDU Type field indicates that the TS PPDU includes a TS PPDU body part carrying the ACK frame, the STA may interpret the TS PPDU as including the independent fields, the TS-MCS field, the number of TS-SIG symbols field, the PPDU Type field, the RA field, the ACK ID field, the CRC field, and the Tail field.

Figure 24:
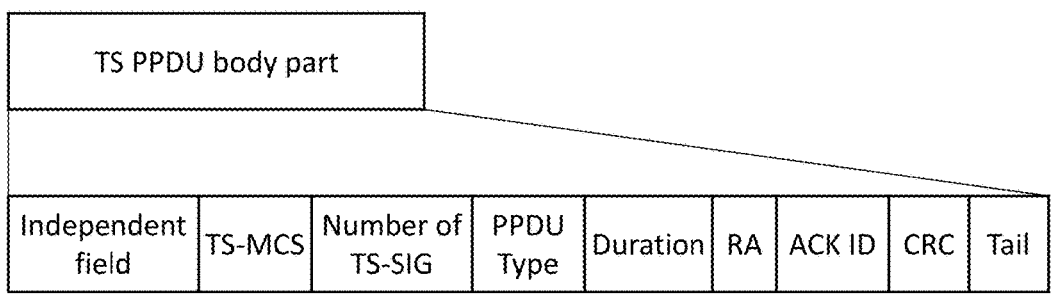
FIG. 24 shows a format of a TS PPDU body part carrying a PS-Poll ACK frame in accordance with an embodiment.

FIG. 24 shows a format of a TS PPDU body part carrying a PS-Poll ACK frame in accordance with an embodiment.

As shown in FIG. 24, the TS PPDU body part carrying the PS-Poll ACK frame may include the independent fields as described above, a TS-MCS field, a number of TS-SIG symbols field, a PPDU Type field, a Duration field, a RA field, an ACK ID field, a CRC field, and a Tail field.

The TS-MCS field may indicate an MCS of some part of the TS PPDU body. In some embodiments, some of the TS PPUD body may be included in the U-SIG field, the rest of the TS PPDU body may be included in the TS-SIG field, and TS-MCS field may indicate the MCS of the TS-SIG field.

The number of TS-SIG symbols field may indicate the number of the TS-SIG fields.

The PPDU Type field may indicate the type of the TS PPDU, for example, but not limited to, among a plurality of frames including a PS-Poll frame, an ACK frame, a PS-Poll ACK frame and a BlockACK frame. The plurality of frames may be control frames, management frames, or time-sensitive frames.

For Ack frames sent by non-QoS STAs, if the More Fragments bit was equal to 0 in the Frame Control field of the immediately previous individually addressed Data or Management frame, the Duration field may be set to 0. In other Ack frames sent by non-QoS STAs, the Duration field may be the value obtained from the Duration/ID field of the immediately previous Data, Management, BlockAckReq, or BlockAck frame minus the time, in microseconds, required to transmit the Ack frame and its SIFS. If the calculated duration includes a fractional microsecond, that value may be rounded up to the next higher integer.

The RA field may be set to the address of the STA contained in the AP.

The Ack ID field may be defined based on value of scrambler initialization and value of FCS. For example, the Ack ID field may be set to the bit sequence Scrambler Initialization [0:6] || FCS [30:31] obtained from the scrambler initialization value in the Service field prior to descrambling, and the FCS field of the PSDU that carries the soliciting frame. The scrambler initialization value may be obtained from the RXVECTOR parameter SCRAMBLER_OR_CRC.

The CRC field may be used as a check sequence to protect the fields that precede the CRC field.

The Tail field may be six bits of 0, which are required to return the convolutional encoder to the zero state.

In some embodiments, if a STA receives a PPDU, the STA may check the TS indication field in the PPDU. If the TS indication field in the PPDU indicates that the PPDU is the TS PPDU, the STA may check the PPDU Type field. If the PPDU Type field indicates that the TS PPDU includes a TS PPDU body part carrying the PS-Poll ACK frame, the STA may interpret the TS PPDU as including the independent fields, the TS-MCS field, the number of TS-SIG symbols field, the PPDU Type field, the Duration field, the RA field, the ACK ID field, the CRC field, and the Tail field.

Figure 25:
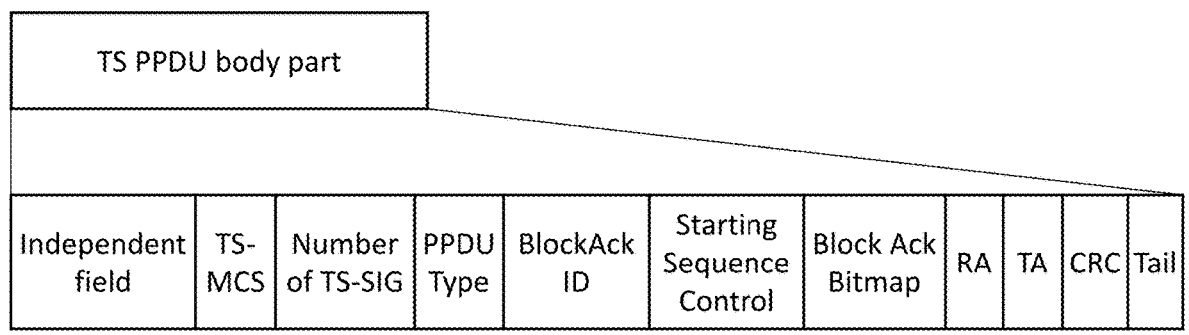
FIG. 25 shows a format of a TS PPDU body part carrying a BlockAck frame in accordance with an embodiment.

FIG. 25 shows a format of a TS PPDU body part carrying a BlockAck frame in accordance with an embodiment.

The BlockAck frame may be sent by a STA to another STA to indicate the receive status of a Data frame including a plurality of MSDUs and/or a plurality of A-MSDUs. For example, if the STA receives a Data frame including a plurality of A-MSDUs from another STA, the STA may transmit the BlockACK frame to the another STA a SIFS after the Data frame.

As shown in FIG. 25, the TS PPDU body part carrying the BlockACK frame may include the independent fields as described above, a TS-MCS field, a number of TS-SIG symbols field, a PPDU Type field, a BlockAck ID field, a Starting Sequence Control field, a Block Ack Bitmap field, a RA field, a TA field, a CRC field, and a Tail field.

The TS-MCS field may indicate an MCS of some part of the TS PPDU body. In some embodiments, some of the TS PPUD body may be included in the U-SIG field, the rest of the TS PPDU body may be included in the TS-SIG field, and TS-MCS field may indicate the MCS of the TS-SIG field.

The number of TS-SIG symbols field may indicate the number of the TS-SIG fields.

The PPDU Type field may indicate the type of the TS PPDU, for example, but not limited to, among a plurality of frames including a PS-Poll frame, an ACK frame, a PS-Poll ACK frame and a BlockACK frame. The plurality of frames may be control frames, management frames, or time-sensitive frames.

The BlockAck ID field may be set to the value based on the bit sequence of the scrambler initialization value in the SERVICE field. For example, the BlockAck ID field may be set to the first 2 or 6 LSBs of the bit sequence of the scrambler initialization value in the SERVICE field.

The Starting Sequence Control field may contain the sequence number of the first MSDU or A-MSDU for which this PPDU is sent.

In some embodiments, the Block Ack Bitmap field may indicate the received status of up to N MSDUs and A-MSDUs when the BlockAck frame is used during a block ack agreement, for example, where the Block Ack Bitmap field includes N bits. Each bit that is equal to 1 in the Block Ack bitmap field may acknowledge the reception of a single MSDU or A-MSDU in the order of sequence number, with the first bit of the NDP BlockAck bitmap corresponding to the MSDU or A-MSDU with the sequence number that matches the value of the Starting Sequence Control field.

In some embodiments, the Block Ack Bitmap field may indicate the received status of up to N fragments of an MSDU when the Block Ack frame is used in a fragment BA procedure, for example, where the Block Ack Bitmap field includes N bits. Each bit that is equal to 1 in the BlockAck Bitmap may acknowledge the reception of a single fragment of an MSDU, in the order of the fragment number, with the first bit of the BlockAck Bitmap corresponding to the MPDU with fragment number equal to 0 or N.

The RA field may be set to the address of the STA contained in the AP.

The TA field value may be set to the address of the STA transmitting the frame.

The CRC field may be used as a check sequence to protect the fields that precede the CRC field.

The Tail field may be six bits of 0, which are required to return the convolutional encoder to the zero state.

In some embodiments, if a STA receives a PPDU, the STA may check the TS indication field in the PPDU. If the TS indication field in the PPDU indicates that the PPDU is the TS PPDU, the STA may check the PPDU Type field. If the PPDU Type field indicates that the TS PPDU includes a TS PPDU body part carrying the BlockACK, the STA may interpret the TS PPDU as including the independent fields, the TS-MCS field, the number of TS-SIG symbols field, the PPDU Type field, the BlockAck ID field, the Starting Sequence Control field, the Block Ack Bitmap field, the RA field, the TA field, the CRC field, and the Tail field.

The TS PPDU may be introduced with a new IFS which is shorter than SIFS. Hereinafter, the new IFS will be described in accordance with FIG. 26 and FIG. 27.

Figure 26:
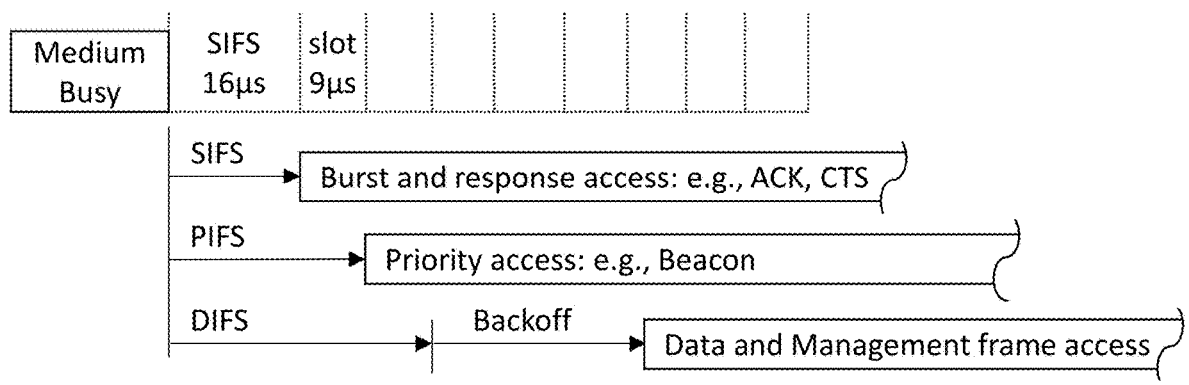
FIG. 26 shows a various interframe spaces used in the wireless local area network in accordance with an embodiment.

FIG. 26 shows a various interframe spaces used in the wireless local area network in accordance with an embodiment.

As shown in FIG. 26, a STA may transmit an ACK or a CTS frame if the medium is determined to be idle during a SIFS. For example, the SIFS may be 16 μs.

The STA may transmit a Beacon frame if the medium is determined to be idle during a SIFS. For example, the PIFS may be (16+9) μs.

The STA may transmit a Data frame or a management frame if the medium is determined to be idle during a DIFS and a backoff time.

Figure 27:
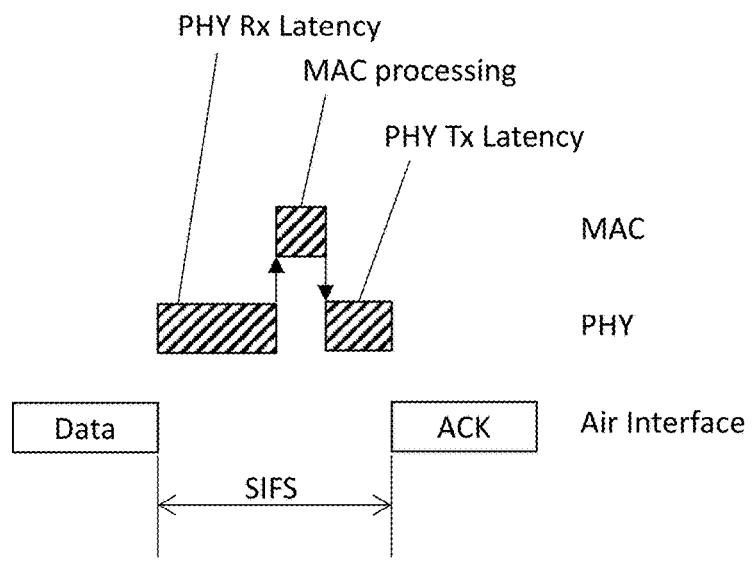
FIG. 27 shows considerations for design of a short interframe spaces (SIFS).

FIG. 27 shows considerations for design of a short interframe spaces (SIFS).

As shown in FIG. 27, the SIFS has been designed to consider duration of PHY Rx Latency, MAC Processing, and PHY Tx Latency. Since the TS PPDU does not require all MAC processing time, at least MAC processing time may be saved.

Therefore, a STA may transmit a PPDU in response to a TS-PPDU a predetermined IFS after the TS-PPDU. The predetermined IFS may be shorter than the SIFS.

Figure 28:
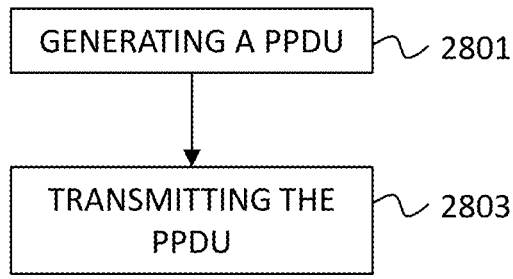
FIG. 28 is a flowchart showing a method for transmitting a TS-PPDU.

FIG. 28 is a flowchart showing a method for transmitting a TS-PPDU.

In 2801, the wireless communication device 30 may generate a TS-PPDU as shown in FIG. 8 to FIG. 13.

In 2803, the wireless communication device 30 may transmit the TS-PPDU.

Figure 29:
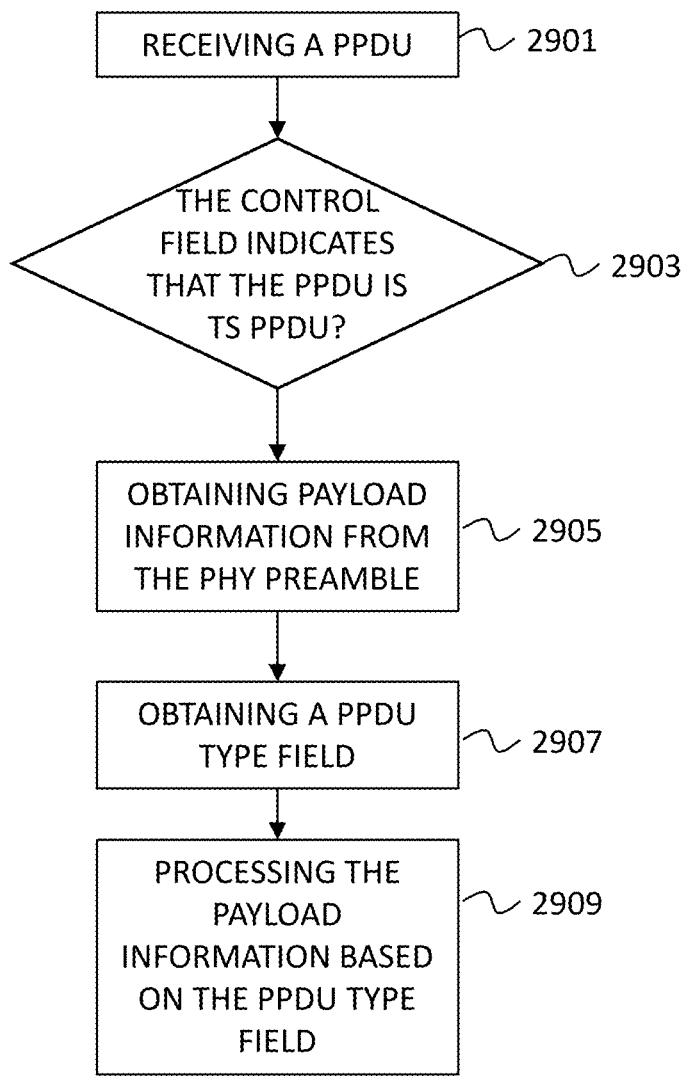
FIG. 29 is a flowchart showing a method for receiving a PPDU.

FIG. 29 is a flowchart showing a method for receiving a PPDU.

In 2901, the wireless communication device 30 may receive a PPDU as shown in FIG. 8 to FIG. 13.

In 2903, the wireless communication device 30 may check a TS indication field in the TS-PPDU. The TS indication field may indicate whether the received PPDU is the TS-PPDU carrying payload information in a PHY preamble and no data field.

In 2905, the wireless communication device 30 may obtain payload information from the PHY preamble if the TS indication field indicates that the received PPUD is the TS-PPDU.

In 2907, the wireless communication device 30 may obtain a PPDU type field from the PHY preamble. The PPDU type field may indicate which payload information is included in the PHY preamble of the PPDU.

In 2909, the wireless communication device 30 may process the payload information based on the PPDU type field. In some embodiments, the wireless communication device 30 may process the payload information in the received PPDU as an ACK frame if the PPDU type field indicates that the PHY preamble of the PPDU includes payload information for the ACK frame. In some embodiments, the wireless communication device 30 may process the payload information in the received PPDU as a block ACK frame if the PPDU type field indicates that the PHY preamble of the PPDU includes payload information for the block ACK frame. In some embodiments, the wireless communication device 30 may process the payload information in the received PPDU as a PS-Poll frame if the PPDU type field indicates that the PHY preamble of the PPDU includes payload information for the PS-Poll frame. In some embodiments, the wireless communication device 30 may process the payload information in the received PPDU as a PS-Poll ACK frame if the PPDU type field indicates that the PHY preamble of the PPDU includes payload information for the PS-Poll ACK frame. In some embodiments, the wireless communication device 30 may process the PPUD as including a NDPA frame and a NDP and process the payload information in the received PPDU as a null data PPDU (NDP) announcement frame if the PPDU type field indicates that the PHY preamble of the PPDU includes payload information for the NDP announcement frame.

The various illustrative blocks, units, modules, components, methods, operations, instructions, items, and algorithms may be implemented or performed with a processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device for facilitating wireless communication, comprising processing circuitry configured to cause:
   receiving a physical layer (PHY) protocol data unit (PPDU) including a PHY preamble including a first short training field (STF) corresponding to a non-high-throughput (Non-HT) short training field (L-STF), a first long training field (LTF) corresponding to a Non-HT long training field (L-LTF), a first signal field corresponding to a Non-HT signal (L-SIG) field, a second signal field corresponding to a repeated Non-HT signal (RL-SIG) field, and a third signal field corresponding to a universal signal (U-SIG) field;
   checking a control field in the PPDU, the control field indicating whether the PHY preamble in the PPDU carries payload information and the PPDU includes no data field carrying payload information;
   obtaining the payload information from the PHY preamble if the control field indicates that the PHY preamble in the PPDU includes the payload information and the PPDU carries no data field; and
   processing the payload information.

2. The electronic device of claim 1, wherein processing the payload information comprises:
   obtaining a PPDU type field from the PHY preamble, the PPDU type field indicating which payload information is included in the PHY preamble of the PPDU; and
   processing the payload information based on the PPDU type field.

3. The electronic device of claim 2, wherein the payload information is processed as an ACK frame if the PPDU type field indicates that the PHY preamble of the PPDU includes payload information for the ACK frame.

4. The electronic device of claim 3, wherein the payload information includes a receiver address field and a transmitter address field.

5. The electronic device of claim 2, wherein the payload information is processed as a block ACK frame if the PPDU type field indicates that the PHY preamble of the PPDU includes payload information for the block ACK frame.

6. The electronic device of claim 2, wherein the payload information includes a starting sequence control field containing a sequence number of a first MSDU or A-MSDU, and a block ack bitmap field indicating a received status of a plurality of MSDUs or A-MSDUs.

7. The electronic device of claim 2, wherein the payload information is processed as a PS-Poll frame if the PPDU type field indicates that the PHY preamble of the PPDU includes payload information for the PS-Poll frame.

8. The electronic device of claim 2, wherein the payload information is processed as a PS-Poll ACK frame if the PPDU type field indicates that the PHY preamble of the PPDU includes payload information for the PS-Poll ACK frame.

9. The electronic device of claim 2, wherein the payload information is processed as a null data PPDU (NDP) announcement frame and the PPUD is processed as a NDP if the PPDU type field indicates that the PHY preamble of the PPDU includes payload information for the NDP announcement frame.

10. The electronic device of claim 9, wherein the PHY preamble further includes a fourth signal field following the third field, a second STF following the fourth signal field, a second LTF following the second STF, and the second LTF is for channel estimation for sounding procedure.

11. The electronic device of claim 9, wherein the payload information includes at least one STA information field, each of the at least one STA information field containing STA-specific information for a STA which is intended to receive the NDP.

12. The electronic device of claim 11, wherein CRC and Tail fields are appended to every N STA info field, N being an integer greater than 0.

13. The electronic device of claim 1, wherein the payload information is included in the U-SIG.

14. The electronic device of claim 1, wherein the PHY preamble further includes a fourth signal field following the U-SIG field, and the payload information is included in the fourth signal field.

15. The electronic device of claim 1, wherein the PHY preamble further includes a fourth signal field following the U-SIG field, some of the payload information is included in the U-SIG and other of the payload information is included in the fourth signal field.

16. The electronic device of claim 1, the one or more processors is configured to further cause:

transmitting another PPDU in response to the PPDU after a predetermined interframe space,
wherein the predetermined interframe space is shorter than a Short IFS (SIFS).

17. A method performed by an electronic device for facilitating wireless communication, the method comprising:

receiving a physical layer (PHY) protocol data unit (PPDU) including a PHY preamble including a first short training field (STF) corresponding to a non-high-throughput (Non-HT) short training field (L-STF), a first long training field (LTF) corresponding to a Non-HT long training field (L-LTF), a first signal field corresponding to a Non-HT signal (L-SIG) field, a second signal field corresponding to a repeated Non-HT signal (RL-SIG) field, and a third signal field corresponding to a universal signal (U-SIG) field;

checking a control field in the PPDU, the control field indicating whether the PHY preamble in the PPDU carries payload information and the PPDU carries no data field carrying payload information;

obtaining the payload information from the PHY preamble if the control field indicates that the PHY preamble in the PPDU includes the payload information and the PPDU carries no data field; and processing the payload information.

18. The method of claim 17, further comprising:

obtaining a PPDU type field from the PHY preamble, the PPDU type field indicating which payload information is included in the PHY preamble of the PPDU; and processing the payload information based on the PPDU type field.

19. An electronic device for facilitating wireless communication, comprising processing circuitry configured to cause:

generating a physical layer (PHY) protocol data unit (PPDU) including a PHY preamble including a first short training field (STF) corresponding to a non-high-throughput (Non-HT) short training field (L-STF), a first long training field (LTF) corresponding to a Non-HT long training field (L-LTF), a first signal field corresponding to a Non-HT signal (L-SIG) field, a second signal field corresponding to a repeated Non-HT signal (RL-SIG) field, and a third signal field corresponding to a universal signal (U-SIG) field; and transmitting the PPDU, wherein the PPDU include a control field indicating whether the PHY preamble in the PPDU includes carries payload information and the PPDU carries no data field carrying payload information, the PHY preamble includes payload information if the control field indicates that the PHY preamble in the PPDU includes payload information and the PPDU carries no data field.

20. The electronic device of claim 19, wherein the payload information includes a PPDU type field indicating which payload information is included in the PHY preamble of the PPDU, if the control field indicates that the PHY preamble in the PPDU includes medium access control (MAC) information and the PPDU carries no data field.

* * * * *